United States Patent
Mishima et al.

(10) Patent No.: US 8,238,214 B2
(45) Date of Patent: Aug. 7, 2012

(54) OPTICAL RECORDING MEDIUM AND METHOD FOR REPRODUCING THE SAME

(75) Inventors: Koji Mishima, Tokyo (JP); Tsutomu Aoyama, Tokyo (JP); Takashi Kikukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 27 days.

(21) Appl. No.: 12/451,526

(22) PCT Filed: Apr. 16, 2008

(86) PCT No.: PCT/JP2008/057422
§ 371 (c)(1),
(2), (4) Date: Nov. 17, 2009

(87) PCT Pub. No.: WO2008/142928
PCT Pub. Date: Nov. 27, 2008

(65) Prior Publication Data
US 2010/0074084 A1     Mar. 25, 2010

(30) Foreign Application Priority Data

May 18, 2007 (JP) .................. 2007-133279
Aug. 27, 2007 (JP) .................. 2007-219462

(51) Int. Cl.
*G11B 7/00* (2006.01)

(52) U.S. Cl. ........................ 369/94; 369/47.5

(58) Field of Classification Search ............ 369/94, 369/100, 283, 47.5, 53.26, 116, 275.5
See application file for complete search history.

(56) References Cited

U.S. PATENT DOCUMENTS

| | | | |
|---|---|---|---|
| 5,677,903 A * | 10/1997 | Holtslag et al. | 369/112.28 |
| 6,992,965 B1 * | 1/2006 | Glushko et al. | 369/103 |
| 7,143,426 B2 | 11/2006 | Mishima et al. | |
| 7,750,276 B2 * | 7/2010 | Miyamoto et al. | 250/201.5 |
| 2001/0005350 A1 * | 6/2001 | Kitaura et al. | 369/94 |
| 2002/0051414 A1 * | 5/2002 | Kuribayashi | 369/53.24 |

(Continued)

FOREIGN PATENT DOCUMENTS

JP    A-2004-213720    7/2004

(Continued)

OTHER PUBLICATIONS

International Search Report issued in international application No. PCT/JP2008/057422 on Jul. 29, 2008.

*Primary Examiner* — Thomas Alunkal
(74) *Attorney, Agent, or Firm* — Oliff & Berridge, PLC

(57) ABSTRACT

An optical recording medium which includes three or more information layers and has a higher stack density of information layers than before in the direction of thickness while reducing crosstalk during reproduction, and a method for reading the optical recording medium are provided. The optical recording medium has a three-layer structure which includes a substrate, a first information layer, a first spacer layer, a second information layer, a second spacer layer, a third information layer, and a cover layer thinner than the substrate, with these layers being stacked in that order over the substrate, wherein the following Equation (I) is satisfied:

$(R_2 \times R_3 \times R_2)/R_1 \leq 0.0032$     Equation (I)

where $R_1$ is the reflectivity of the first information layer, $R_2$ is the reflectivity of the second information layer, and $R_3$ is the reflectivity of the third information layer, and the first spacer layer and the second spacer layer are equal to each other in thickness.

10 Claims, 4 Drawing Sheets

U.S. PATENT DOCUMENTS

| | | |
|---|---|---|
| 2005/0013216 A1* | 1/2005 | Kim et al. .................... 369/47.5 |
| 2006/0028971 A1* | 2/2006 | Mishima et al. ........... 369/275.1 |
| 2006/0062133 A1* | 3/2006 | Tsukagoshi et al. ....... 369/275.1 |
| 2006/0077877 A1* | 4/2006 | Tsukagoshi et al. ....... 369/275.1 |
| 2006/0126485 A1* | 6/2006 | Sugaya et al. ............. 369/275.1 |
| 2006/0203680 A1* | 9/2006 | Hong et al. ..................... 369/94 |
| 2007/0058516 A1 | 3/2007 | Watabe et al. |
| 2007/0189147 A1* | 8/2007 | Miyamoto et al. ......... 369/275.1 |

FOREIGN PATENT DOCUMENTS

| | | |
|---|---|---|
| JP | A-2005-285222 | 10/2005 |
| JP | A-2006-073053 | 3/2006 |
| JP | A-2007-080303 | 3/2007 |
| JP | A-2008-065961 | 3/2008 |

* cited by examiner

OPTICAL RECORDING MEDIUM AND METHOD FOR REPRODUCING THE SAME

TECHNICAL FIELD

The present invention relates to an optical recording medium which has three or more information layers provided in between a substrate and a cover layer thinner than the substrate, and to a method for reproducing the same.

BACKGROUND ART

Optical recording media such as CDs (Compact Discs) and DVDs (Digital Versatile Discs) have been widely used as information recording media. Further, recent years have seen the ongoing diffusion of a type of optical recording medium referred to as Blu-ray Disc (Registered Trade Mark; hereinafter called "BD"). The BD employs, for recording/reproducing operations, a blue or violet laser beam that is shorter in wavelength than a conventional one as well as an objective lens greater in numerical aperture NA than a conventional one. The BD is thus capable of storing a larger amount of information than before. More specifically, such optical recording media being widely used are compatible with a reproducing apparatus or recording/reproducing apparatus that employs, for recording/reproducing operations, a laser beam of a wavelength of 405 nm (in the range of from 375 to 435 nm) and an objective lens of a numerical aperture NA of 0.85 (in the range from 0.7 to 0.95) for irradiation of the optical recording media with the laser beam.

Note that the so-called BD optical recording medium has tracks formed at a track pitch of 0.32 μm (in the range of from 0.1 to 0.5 μm). The so-called BD optical recording medium is largely divided into a BD-ROM on which data cannot be written or rewritten, a BD-R on which data can be written once, and a BD-RE on which data can be rewritten.

Generally, a tilt in the optical recording medium due to a warp or the like would cause the deformation of a beam spot of the laser beam at an information layer to broaden the beam spot, thereby inducing an error. The larger the numerical aperture of the objective lens, the wider becomes the laser beam width in the optical recording medium. Thus, the deformation of the beam spot caused by the tilt is likely increased. As described above, the deformation of the beam spot resulting from the tilt is likely increased because the so-called BD optical recording medium employs an objective lens with a numerical aperture NA greater than a conventional one. On the other hand, suppose that the information layer is located closer to the light incident surface (the surface of the optical recording medium on the cover layer side). In this case, since the optical path length of the laser beam from the light incident surface to the information layer is shorter, the beam spot of the laser beam is less deformed on the information layer even at the same tilt of the optical recording medium. Accordingly, to reduce errors caused by the tilt of the optical recording medium, the information layer is located preferably as close to the light incident surface as possible. The so-called BD optical recording medium requires the information layer to be located within the range of 120 μm or less from the light incident surface, and is thought to be provided with the information layer preferably within the range of 110 μm or less from the light incident surface.

Meanwhile, foreign matters such as fingerprints (sebum) or dust particles adhered to the light incident surface would cause the foreign matter to be reflected on the beam spot of the laser beam on the information layer, thus sometimes inducing an error. Even with foreign matters of the same size, the more closely the information layer is located to the light incident surface, the greater the percentage of the portion of the beam spot on which the foreign matter has effects becomes. Accordingly, to reduce errors due to the foreign matter on the light incident surface, the information layer is located preferably as far away from the light incident surface as possible. The so-called BD optical recording medium requires the information layer to be located within the range of 40 μm or more from the light incident surface, and is thought to be provided with the information layer preferably within the range of 50 μm or more from the light incident surface.

For the reasons mentioned above, the so-called BD optical recording medium is provided with a cover layer thinner than the substrate and an information layer located within the range of a predetermined distance from the light incident surface. This allows for reducing those errors that would be otherwise caused by the tilt of the optical recording medium and by the foreign matter on the light incident surface. To be more specific, the optical recording medium, which has the information layer located at approximately 100 μm from the light incident surface, is being spread.

Furthermore, the optical recording medium can include a plurality of information layers between the substrate and the cover layer with a light-transmitting spacer layer sandwiched between the adjacent information layers, thereby increasing the recording capacity. Note that to record data on the optical recording medium having a plurality of information layers, the recording laser beam is focused on a target information layer to be recorded on, thereby data can be selectively recorded on the target information layer. Furthermore, the reproduction laser beam is focused on a target information layer to be reproduced from, thereby data can be selectively reproduced from the target information layer. A suggestion has been also made to the structure of the so-called BD optical recording medium in which a plurality of information layers are included. A dual layer optical recording medium of BD is being spread which has an L0 information layer (a first information layer) located at approximately 100 μm from the light incident surface and an $L_1$ information layer (a second information layer) located at approximately 75 μm from the light incident surface.

Another suggestion has been also made to the structure of the so-called BD optical recording medium in which three or more multi-layers are included. Even in the case of the three or more multi-layer structure, the all three or more information layers are preferably located within the range between 40 μm and 120 μm from the light incident surface.

However, provision of three or more information layers within such a microscopic region sometimes raises a problem of crosstalk during reproduction. More specifically, the reproduction laser beam for irradiating the optical recording medium is reflected not only on the target information layer from which data is reproduced, but also part of the reproduction laser beam is reflected on another information layer in various manners. Thus, the part of the reproduction laser beam may have effects on the signal beam reflected on the target information layer to be reproduced from. The crosstalk is thought to be divided mainly into two types; inter-layer crosstalk and confocal crosstalk (for example, see Japanese Patent Application Laid-Open No. 2004-213720 and Japanese Patent Application Laid-Open No. 2006-73053).

The inter-layer crosstalk refers to a phenomenon in which crosstalk light reflected on an information layer other than the target information layer to be reproduced from has effects on a signal beam reflected on the target information layer to be reproduced from. This phenomenon may occur not only with the three or more multi-layer optical recording medium but also with the dual layer optical recording medium. For the three or more multi-layer optical recording medium, the inter-layer crosstalk is thought to be reduced by the plurality of spacer layers being formed in mutually different thicknesses. Furthermore, the greater the thickness of the spacer layers between the information layers through which the crosstalk light passes, the more the inter-layer crosstalk is reduced. It is generally considered that the spacer layers with a thickness of 15 μm or greater can reduce the inter-layer crosstalk substantially to an insignificant level.

On the other hand, the confocal crosstalk refers to a phenomenon in which the optical path of a signal beam reflected only once on the target information layer to be reproduced from will coincide with the optical path of the crosstalk light reflected in another manner. This phenomenon is sensed at a photodetector as if both the beams were reflected at the common focus though the focal positions of the optical paths are actually different from each other in the optical recording medium. This phenomenon occurs with the three or more multi-layer optical recording medium. The thicknesses of each layer of the optical recording medium vary microscopically in its circumferential direction, thus portions highly affected by the confocal crosstalk and portions less affected by the confocal crosstalk coexist in the circumferential direction. This may raise fluctuation in reflectivity per one revolution, thereby causing degradation of accuracy in reproducing data. This confocal crosstalk is also thought to be reduced by the plurality of spacer layers being formed to have thicknesses different from each other.

However, to prevent both the inter-layer crosstalk and the confocal crosstalk, each spacer layer has to be thick enough or more than enough to prevent the inter-layer crosstalk. Simultaneously, to reduce the confocal crosstalk, each spacer layer needs to be different from each other in thickness. In other words, some spacer layers are required to have a thickness that is more than enough to prevent the inter-layer crosstalk. Such an increase in thickness of the spacer layers would cause the stack density of information layers to be reduced in the direction of thickness, thereby decreasing the number of information layers available.

Note that the number of information layers available can be presumably increased by extending the range of the information layers away from the light incident surface. However, in this case, the aforementioned errors due to the tilt of the optical recording medium would more likely occur. It can also be thought to increase the number of information layers available by extending the range where the information layers are located towards the light incident surface side. However, as described above, the errors due to the foreign matter on the light incident surface would more likely occur.

DISCLOSURE OF INVENTION

The present invention was developed in view of the aforementioned problems. It is therefore an object of the present invention to provide an optical recording medium which includes three or more information layers and is capable of providing a greater stack density of information layers in the direction of thickness than a conventional one while reducing crosstalk during reproduction. It is another object of the invention to provide a method for reproducing the optical recording medium.

The present invention achieves the aforementioned objects by providing an optical recording medium having a three or more multi-layer structure which includes a substrate, a first information layer, a first spacer layer, a second information layer, a second spacer layer, a third information layer, and a cover layer thinner than the substrate, with these layers being stacked in that order over the substrate, wherein the following Equation (I) is satisfied:

$$(R_2 \times R_3 \times R_2)/R_1 \leq 0.0032 \qquad \text{Equation (I)},$$

where $R_1$ is a reflectivity of the first information layer, $R_2$ is a reflectivity of the second information layer, and $R_3$ is a reflectivity of the third information layer, and the first spacer layer and the second spacer layer are equal to each other in thickness.

Moreover, the present invention achieves the aforementioned objects by providing an optical recording medium having a four or more multi-layer structure which includes a substrate, a first information layer, a first spacer layer, a second information layer, a second spacer layer, a third information layer, a third spacer layer, a fourth information layer, and a cover layer thinner than the substrate, with these layers being stacked in that order over the substrate, wherein the following Equation (II) is satisfied:

$$(R_2 \times R_3 \times R_4 \times 2)/R_1 \leq 0.0032 \qquad \text{Equation (II)},$$

where $R_1$ is a reflectivity of the first information layer, $R_2$ is a reflectivity of the second information layer, $R_3$ is a reflectivity of the third information layer, and $R_4$ is a reflectivity of the fourth information layer, and the first spacer layer and the third spacer layer are equal to each other in thickness.

Furthermore, the present invention achieves the aforementioned objects by providing an optical recording medium having an n or more multi-layer structure (n is an integer equal to 5 or greater) which includes a substrate, a first information layer, a first spacer layer, a second information layer, an (n−1)th information layer, an (n−1)th spacer layer, an nth information layer, and a cover layer thinner than the substrate, with these layer being stacked in that order over the substrate, wherein the following Equation (III) is satisfied:

$$(R_2 \times R_{n-1} \times R_n \times 2)/R_1 \leq 0.0032 \qquad \text{Equation (III)},$$

where $R_1$ is a reflectivity of the first information layer, $R_2$ is a reflectivity of the second information layer, $R_{n-1}$ is a reflectivity of the (n−1)th information layer, and $R_n$ is a reflectivity of the nth information layer, and the first spacer layer and the (n−1)th spacer layer are equal to each other in thickness.

The inventors prepared various optical recording media as samples which were different from each other in information layer reflectivity and in spacer layer thickness, and measured the reproduction characteristics of the samples. The inventors found that if the reflectivities of the three adjacent information layers of the three or more multi-layer optical recording medium satisfied the relationship expressed by the above Equation (I), then the confocal crosstalk was reduced to a practically insignificant level even with the two spacer layers between these information layers being equal in thickness to each other. Note that for the four or more multi-layer optical recording medium, if the reflectivities of any three adjacent information layers satisfy the relationship expressed by the above Equation (I), then the confocal crosstalk is reduced with these three information layers.

It was also found that if the reflectivities of the adjacent four information layers of the four or more multi-layer optical recording medium satisfied the relationship expressed by the above Equation (II), the confocal crosstalk was reduced to a practically insignificant level. This reduction was realized even when of the three spacer layers between these four information layers, the spacer layer closest to the substrate is equal in thickness to the spacer layer closest to the cover layer. Note that also for the five or more multi-layer optical recording medium, if the reflectivities of any four adjacent information layers satisfy the relationship expressed by the above Equation (II), then the confocal crosstalk can be reduced with these four information layers.

The confocal crosstalk was also found to be reduced to a practically insignificant level in the n or more multi-layer optical recording medium (n is an integer equal to five or greater) which includes the substrate, the first information layer, the first spacer layer, the second information layer, the (n−1)th information layer, the (n−1)th spacer layer, the nth information layer, and the cover layer thinner than the substrate. These layers are stacked in that order over the substrate. Even with the first spacer layer and the (n−1)th spacer layer being equal to each other in thickness, the confocal crosstalk is reduced if the reflectivity $R_1$ of the first information layer, the reflectivity $R_2$ of the second information layer, the reflectivity $R_{n-1}$ of the (n−1)th information layer, and the reflectivity $R_n$ of the nth information layer satisfy the relationship expressed by the above Equation (III). Note that when two spacer layers (one or both of the two spacer layers being not the first spacer layer and the (n−1)th spacer layer) stacked via at least other two spacer layers are equal to each other in thickness, the confocal crosstalk can be reduced in these n information layers. This can be realized if the reflectivities of the four information layers adjacent to these two spacer layers (one or both of the two spacer layers being not the first spacer layer and the (n−1)th spacer layer) satisfy the relationship corresponding to the above Equation (III).

Note that if the reflectivity of the first information layer is 1%, then $R_1$ is 0.01. The same holds true for $R_2, R_3, R_4, R_{n-1},$ and $R_n$.

Even when the plurality of spacer layers are equal to each other in thickness, the confocal crosstalk is reduced. Thus, some of them which were conventionally increased in thickness to prevent the confocal crosstalk can be reduced in thickness as compared with the conventional ones. It is thus possible to increase the stack density of information layers in the direction of thickness as compared with the conventional ones.

For example, this makes it possible to increase the number of information layers available as compared with the conventional cases if the information layer closest to the light incident surface and the information layer farthest from the light incident surface are located at the same positions as before. Alternatively, when the number of information layers is the same as before, the information layer closest to the light incident surface can be located farther away from the light incident surface than before, and/or the information layer farthest from the light incident surface can be located closer to the light incident surface than before. This makes it possible to reduce errors due to tilt of the optical recording medium and/or errors due to a foreign matter on the light incident surface.

In this manner, the present invention was configured to restrict the reflectivities of a plurality of information layers to a given relationship, thereby equalizing at least two spacer layers in thickness and reducing at least one spacer layer in thickness while preventing the confocal crosstalk. The three or more multi-layer optical recording medium was thus developed based on a different concept from that of the conventional multi-layer optical recording medium for which as common sense, multiple spacer layers were designed to be different from each other in thickness.

Accordingly, the above object is achieved by the following inventions.

(1) An optical recording medium having a three or more multi-layer structure which includes a substrate, a first information layer, a first spacer layer, a second information layer, a second spacer layer, a third information layer, and a cover layer thinner than the substrate, with these layers being stacked in that order over the substrate, wherein the following Equation (I) is satisfied:

$$(R_2 \times R_3 \times R_2)/R_1 \leq 0.0032 \qquad \text{Equation (I)},$$

where $R_1$ is a reflectivity of the first information layer, $R_2$ is a reflectivity of the second information layer, and $R_3$ is a reflectivity of the third information layer, and the first spacer layer and the second spacer layer are equal to each other in thickness.

(2) An optical recording medium having a four or more multi-layer structure which includes a substrate, a first information layer, a first spacer layer, a second information layer, a second spacer layer, a third information layer, a third spacer layer, a fourth information layer, and a cover layer thinner than the substrate, with these layers being stacked in that order over the substrate, wherein
the following Equation (II) is satisfied:

$$(R_2 \times R_3 \times R_4 \times 2)/R_1 \leq 0.0032 \qquad \text{Equation (II)},$$

where $R_1$ is a reflectivity of the first information layer, $R_2$ is a reflectivity of the second information layer, $R_3$ is a reflectivity of the third information layer, and $R_4$ is a reflectivity of the fourth information layer, and the first spacer layer and the third spacer layer are equal to each other in thickness.

(3) The optical recording medium according to (2), wherein the first spacer layer has a thickness different from that of the second spacer layer by 3 μm or more.

(4) An optical recording medium having an n or more multi-layer structure (n is an integer equal to 5 or greater) which includes a substrate, a first information layer, a first spacer layer, a second information layer, an (n−1)th information layer, an (n−1)th spacer layer, an nth information layer, and a cover layer thinner than the substrate, with these layer being stacked in that order over the substrate, wherein
the following Equation (III) is satisfied:

$$(R_2 \times R_{n-1} \times R_n \times 2)/R_1 \leq 0.0032 \qquad \text{Equation (III)},$$

where $R_1$ is a reflectivity of the first information layer, $R_2$ is a reflectivity of the second information layer, $R_{n-1}$ is a reflectivity of the (n−1)th information layer, and $R_n$ is a reflectivity of the nth information layer, and the first spacer layer and the (n−1)th spacer layer are equal to each other in thickness.

(5) The optical recording medium according to any one of (1) to (4), wherein all information layers are disposed within a range of 50 μm or more from a light incident surface in a thickness direction.

(6) The optical recording medium according to any one of (1) to (5), wherein all information layers are disposed within a range of 120 μm or less from a light incident surface in a thickness direction.

(7) The optical recording medium according to any one of (1) to (6), on which information to instruct that at least two of the information layers are irradiated for reproducing the two information layers with reproduction laser beams at different reproduction power has been recorded.

(8) A method for reproducing an optical recording medium, wherein at least two of the information layers contained in the optical recording medium according to any one of (1) to (7) are irradiated with reproduction laser beams at different reproduction powers in order to reproduce information recorded on each of the information layers.

Note that at the time of filing the present application, it is possible to deposit the spacer layer generally with an accuracy of ±1 μm. That is, the variation of the spacer layer in thickness is approximately 2 μm. Accordingly, as used herein, the expression "the first spacer layer and the second spacer layer are equal to each other in thickness" means that the difference in thickness between the first spacer layer and the second spacer layer is 2 μm or less. The same holds true for the expression "at least two layers of the first spacer layer, the second spacer layer, and the third spacer layer are equal to each other in thickness."

According to the present invention, it is possible to realize an optical recording medium which includes three or more information layers and has an increased stack density of information layers in the direction of thickness as compared with a conventional one while reducing crosstalk during reproduction.

BEST MODE FOR CARRYING OUT THE INVENTION

Now, with reference to the accompanying drawings, a description will be given of the preferred exemplary embodiments for carrying out the present invention.

Figure 1:
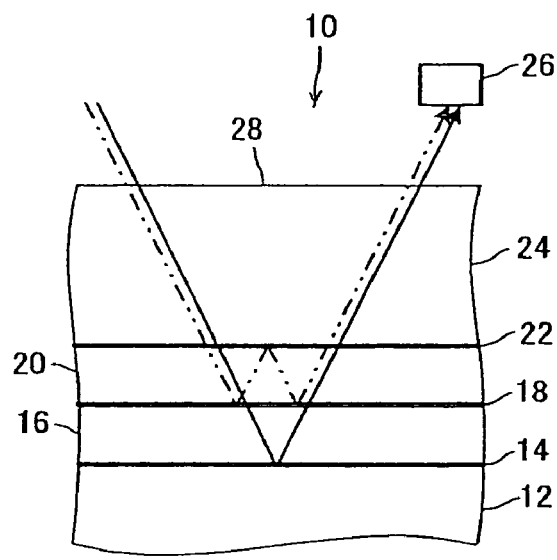
FIG. 1 a cross-sectional side view schematically illustrating the structure of an optical recording medium according to a first exemplary embodiment of the present invention FIG. 2 a cross-sectional side view schematically illustrating the structure of an optical recording medium according to a second exemplary embodiment of the present invention FIG. 3 a cross-sectional side view schematically illustrating the structure of an optical recording medium according to a third exemplary embodiment of the present invention FIG. 4 a cross-sectional side view schematically illustrating the structure of an optical recording medium according to a fourth exemplary embodiment of the present invention FIG. 5 a graph showing the relationship between the predetermined coefficient calculated from the reflectivity of each information layer of an optical recording medium according to Experimental Example 1 and the fluctuation in reflectivity of the first information layer FIG. 6 a graph showing the relationship between the predetermined coefficient calculated from the reflectivity of each information layer of an optical recording medium according to Experimental Example 2 and the fluctuation in reflectivity of the first information layer.

As shown in FIG. 1, an optical recording medium 10 according to a first exemplary embodiment of the present invention has a three-layer structure and includes a substrate 12, a first information layer 14, a first spacer layer 16, a second information layer 18, a second spacer layer 20, a third information layer 22, and a cover layer 24 thinner than the substrate 12. These layers are stacked in that order over the substrate 12. The optical recording medium 10 is characterized in that the following Equation (I) is satisfied:

$$(R_2 \times R_3 \times R_2)/R_1 \leq 0.0032 \quad \text{Equation (I)}$$

where $R_1$ is the reflectivity of the first information layer 14, $R_2$ is the reflectivity of the second information layer 18, and $R_3$ is the reflectivity of the third information layer 22, and the first spacer layer 16 and the second spacer layer 20 are equal to each other in thickness. The other configuration does not seem to be particularly crucial to the understanding of the description of the first exemplary embodiment and thus will be omitted as appropriate. Note that reference sign 26 in FIG. 1 indicates a photodetector for reproduction. Each of the reflectivity $R_1$ of the first information layer 14, the reflectivity $R_2$ of the second information layer 18, and the reflectivity $R_3$ of the third information layer 22 is equivalent to one detected by the photodetector 26.

The optical recording medium 10, which is disc shaped with an outer diameter of approximately 120 mm and a thickness of approximately 1.2 mm, employs a blue or violet laser beam of a wavelength of 405 nm (in the range of from 375 to 435 nm) for recoding/reproducing operations.

The substrate 12 is approximately 1.1 mm in thickness and has, on its surface closer to the cover layer 24, a concavo-convex pattern to form grooves or pits. Note that the terms "grooves" and "pits" are generally used to refer to a recessed portion employed for recording/reproducing data. However, even those projected portions that protrude towards the cover layer 24 and are used to record or reproduce data will also be called "grooves" or "pits" for convenience in the present application. In the first exemplary embodiment, the projected portion that protrudes towards the cover layer 24 is a groove or pit. The groove or pit is formed with a track pitch of 0.32 μm (in the range of from 0.1 to 0.5 μm). The substrate 12 is formed of polycarbonate resin, acrylic resin, epoxy resin, polystyrene resin, polyethylene resin, polypropylene resin, silicone resin, fluorine-based resin, ABS resin, urethane resin or the like.

The reflectivity $R_1$ of the first information layer 14 is preferably greater than the reflectivity $R_2$ of the second information layer 18, and more preferably, greater than any one of the reflectivity $R_2$ of the second information layer 18 and the reflectivity $R_3$ of the third information layer 22.

Furthermore, the reflectivity $R_1$ of the first information layer 14, the reflectivity $R_2$ of the second information layer 18, and the reflectivity $R_3$ of the third information layer 22 are all preferably 0.01 (1(%)) or greater. Accordingly, it is preferable that $$0.0001 \leq (R_2 \times R_3 \times R_2)/R_1.$$

The first information layer 14 is located in the direction of thickness within the range of 120 μm or less from a light incident surface 28 which is the surface of the cover layer 24 of the optical recording medium 10. That is, the first information layer 14, the second information layer 18, and the third information layer 22 are all located within the range of 120 μm or less from the light incident surface 28 in the direction of thickness. The first information layer 14, the second information layer 18, and the third information layer 22 are all preferably located within the range of 110 μm or less from the light incident surface 28 in the direction of thickness.

Furthermore, the third information layer 22 is located within the range of 40 μm or more from the light incident surface 28 in the direction of thickness. That is, the first information layer 14, the second information layer 18, and the third information layer 22 are all located within the range of 40 μm or more from the light incident surface 28 in the direction of thickness. The first information layer 14, the second information layer 18, and the third information layer 22 are all preferably located within the range of 50 μm or more from the light incident surface 28 in the direction of thickness, and more preferably, located within the range of 60 μm or more from the light incident surface 28 in the direction of thickness.

The first information layer 14, the second information layer 18, and the third information layer 22 are differently configured depending on whether they are of the ROM, R, or RE type.

For the ROM type, the first information layer 14, the second information layer 18, and the third information layer 22 are made up of the reflective films formed on the cover layer 24 side concavo-convex pit pattern surfaces of the substrate 12, the first spacer layer 16, and the second spacer layer 20. The reflective film can be formed of a metal material such as Al, Ag, Au, Cu, Mg, Ti, Cr, Fe, Co, Ni, Zn, Ge, Ag, and Pt, or of a dielectric material such as $TiO_2$.

For the R type, the first information layer 14, the second information layer 18, and the third information layer 22 have a recording film of an organic dye material or an inorganic material formed following the cover layer 24 side concavo-convex groove patterns of the substrate 12, the first spacer layer 16, and the second spacer layer 20. The layers 14, 18, and 22 can also include, as required, a dielectric film or reflective film formed on one or both sides of the recording film.

The R type recording film is preferably 10 to 100 nm in thickness. The inorganic material can be, for example, a material which contains substantially Bi, O, and M (M is at least one type of element selected from the group consisting of Mg, Ca, Y, Dy, Ce, Tb, Ti, Zr, V, Nb, Ta, Mo, W, Mn, Fe, Zn, Al, In, Si, Ge, Sn, Sb, Li, Na, K, Sr, Ba, Sc, La, Nd, Sm, Gd, Ho, Cr, Co, Ni, Cu, Ga, and Pb) with a ratio of the number of O atoms to the total number of atoms that constitute the recording film being 62% or greater. Alternatively, the inorganic material can be a material which substantially consists of Bi and O with a ratio of the number of O atoms to the total number of atoms that constitute the recording film being 62% or greater.

Furthermore, the recording film of the first information layer 14 may be formed of a layered material with a Cu layer on the substrate 12 side and a Si layer on the cover layer 24 side. Furthermore, the recording film of the first information layer 14, the second information layer 18, and the third information layer 22 may be formed of a phase change material.

The dielectric film is preferably 2 to 20 nm in thickness. The dielectric film may be formed of, for example, an oxide such as $TiO_2$, $SiO_2$, $Al_2O_3$, ZnO, $CeO_2$, and $Ta_2O_5$, a nitride such as SiN, AlN, GeN, GeCrN, and TiN, a sulfide such as ZnS, or a material which predominantly contains a combination thereof, e.g., a mixture of ZnS and $SiO_2$. Note that the reflective film may be formed of the same material as that of the aforementioned reflective film for ROM type.

For the RE type, the first information layer 14, the second information layer 18, and the third information layer 22 have a recording film of a phase change material formed following the cover layer 24 side concavo-convex groove patterns of the substrate 12, the first spacer layer 16, and the second spacer layer 20. The layers 14, 18, and 22 can also include, as required, a dielectric film or reflective film formed on one or both sides of the recording film. The reflective film and the dielectric film may be formed of the same materials as those of the aforementioned reflective film for ROM type or the dielectric film for R type.

Note that if the first information layer 14, the second information layer 18, and the third information layer 22 are made up of a plurality of films such as the recording film or dielectric film, then $R_1$, $R_2$, and $R_3$ are the reflectivity of the entire information layer formed of a plurality of films. Furthermore, $R_1$, $R_2$, and $R_3$ are also the reflectivity of the space of a recorded portion or a blank portion of the first information layer 14, the second information layer 18, and the third information layer 22. For example, for the R type and RE type, the first information layer 14, the second information layer 18, and the third information layer 22 have a reflectivity of a recorded mark of the recorded portion which is different from the reflectivity of the space of the recorded portion or the blank portion. $R_1$, $R_2$, and $R_3$ are the reflectivity of the space of the recorded portion or the blank portion of the first information layer 14, the second information layer 18, and the third information layer 22. Furthermore, suppose that for the ROM type, the entire surfaces of the first information layer 14, the second information layer 18, and the third information layer 22 are the recorded portion with pits formed thereon. In this case, $R_1$, $R_2$, and $R_3$ are the reflectivity of the space (a part with no pits) of the recorded portion of the first information layer 14, the second information layer 18, and the third information layer 22.

The first spacer layer 16 and the second spacer layer 20 are, for example, about 5 to 30 μm in thickness, and preferably 15 to 30 μm. The first spacer layer 16 and the second spacer layer 20 have the same/similar groove concavo-convex pattern as/to that of the substrate 12 on both side respectively. Note that the step height (groove depth) of the concavo-convex pattern of the substrate 12, the first spacer layer 16, and the second spacer layer 20 is about a few tens of nm (for example, 20 nm). This step height is significantly less than the thickness of the substrate 12, the first spacer layer 16, and the second spacer layer 20, and is considered not particularly significant to the understanding of the first exemplary embodiment. Thus, the concavo-convex pattern is not illustrated in FIG. 1. The first spacer layer 16 and the second spacer layer 20 may be formed of an energy radiation curable resin such as light-transmitting acrylic-based ultraviolet curable resin or epoxy-based ultraviolet curable resin.

The first information layer 14 is formed in a concavo-convex pattern following the concavo-convex pattern of the substrate 12. Furthermore, the second information layer 18 is formed in a concavo-convex pattern following the concavo-convex pattern of the first spacer layer 16. Additionally, the third information layer 22 is formed in a concavo-convex pattern following the concavo-convex pattern of the second spacer layer 20.

The cover layer 24 is, for example, 30 to 120 μm in thickness. As with the first spacer layer 16 and the second spacer layer 20, the cover layer 24 may be formed of an energy radiation curable resin such as light-transmitting acrylic-based ultraviolet curable resin or epoxy-based ultraviolet curable resin. As used herein, the term "energy radiation" is a generic name for electromagnetic waves or particle beams, such as ultraviolet radiation or electron beams, which have the property of hardening specific liquid-state resin. Note that the cover layer 24 may be formed by a fluidized resin being applied onto the substrate and then irradiated with an energy radiation to be thereby hardened, or alternatively, by affixing a light-transmitting film to the substrate. Furthermore, the cover layer 24 may be provided thereon with a hard coat layer of a few μm. When such a hard coat layer is provided, the surface of the hard coat layer serves as the light incident surface 28. Alternatively, when the cover layer 24 is exposed with no hard coat layer provided thereon, the surface of the cover layer 24 serves as the light incident surface 28.

A description will now be made to the operation of the optical recording medium 10.

In the optical recording medium 10, the first spacer layer 16 and the second spacer layer 20 are equal to each other in thickness. Thus, upon reproducing data on the first information layer 14, the optical path of the main signal beam coincides with the optical path of a crosstalk light reflected in another given manner. The crosstalk light may likely have an increased effect on the signal beam.

More specifically, as shown with the solid line in FIG. 1, the main signal beam is incident upon the first information layer 14, on which data is to be reproduced, from the cover layer 24 and then reflected only once towards the cover layer 24. Meanwhile, as shown with the chain double-dashed line in the figure, a beam of crosstalk light is incident upon the second information layer 18 from the cover layer 24 to be reflected towards the cover layer 24. Next, the crosstalk light is incident upon the third information layer 22 from the substrate 12 side to be reflected towards the substrate 12, and is further incident upon the second information layer 18 from the cover layer 24 side to be reflected back towards the cover layer 24. The optical path of this crosstalk light coincides with the optical path of the signal beam. Note that the optical path of a beam of crosstalk light which may be reflected five times or more within the optical recording medium 10 would ultimately coincide generally with the optical path of the signal beam. However, beam of crosstalk light that has been reflected such multiple times may have an extremely low intensity, which would raise no practically significant problem.

On the other hand, the optical recording medium 10 is configured to have such confocal crosstalk that has been reduced to a practically insignificant level even with the first spacer layer 16 and the second spacer layer 20 being equal to each other in thickness. This is because the reflectivity $R_1$ of the first information layer 14, the reflectivity $R_2$ of the second information layer 18, and the reflectivity $R_3$ of the third information layer 22 satisfy the relationship expressed by the above Equation (I). This effect will be explained later in more detail with reference to the Experimental examples.

As mentioned above, the confocal crosstalk can be reduced even when the first spacer layer 16 and the second spacer layer 20 are equal to each other in thickness. Thus, either the first spacer layer 16 or the second spacer layer 20, which were conventionally given different thicknesses to prevent confocal crosstalk, can be made thinner in thickness than before. It is thus possible to increase the stack density of information layers in the direction of thickness as compared with a conventional one.

Thus, when the information layer closest to the light incident surface and the information layer farthest from the light incident surface are located at the same positions as before, three information layers can be provided, for example, at a region where only two information layers could be conventionally provided.

Alternatively, for example, the third information layer 22 closest to the light incident surface 28 can be relocated farther away from the light incident surface 28 than the conventional position. And/or, the first information layer 14 farthest from the light incident surface 28 can be relocated closer to the light incident surface 28 as compared with the conventional position. It is thus possible to prevent errors due to tilt of the optical recording medium 10 and/or errors due to a foreign matter on the light incident surface 28.

Note that at least two information layers of the first information layer 14, the second information layer 18, and the third information layer 22 included in the optical recording medium 10 may be irradiated with reproduction laser beams at different reproduction powers to reproduce information recorded on each information layer.

This allows the photodetector 26 to detect approximate values of the intensity or reflectivity of the reflected beams from the first information layer 14, the second information layer 18, and the third information layer 22. Note that any one of the first information layer 14, the second information layer 18, and the third information layer 22 may store such information as for instructing to reproduce from at least two of the information layers by being irradiated with reproduction laser beams at different reproduction powers. Based on this information, control may be provided to the reproduction power of the reproduction laser beam.

A description will now be made to a second exemplary embodiment of the present invention.

Figure 2:
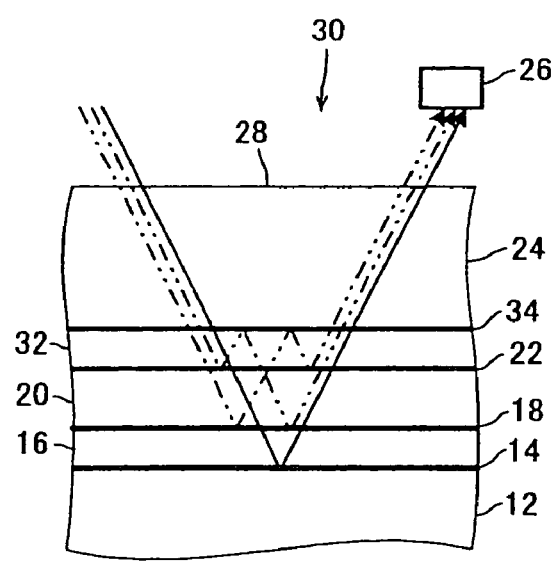

While the optical recording medium 10 according to the first exemplary embodiment has a three-layer structure, an optical recording medium 30 according to a second embodiment has a four-layer structure which, as shown in FIG. 2, includes a third spacer layer 32 and a fourth information layer 34 on the cover layer 24 side of the third information layer. The optical recording medium 30 is characterized in that the following Equation (II) is satisfied:

$$(R_2 \times R_3 \times R_4 \times 2)/R_1 \leq 0.0032 \qquad \text{Equation (II)}$$

where $R_4$ is the reflectivity of the fourth information layer 34, and the first spacer layer 16 and the third spacer layer 32 are equal to each other in thickness.

The reflectivity $R_1$ of the first information layer 14, the reflectivity $R_2$ of the second information layer 18, the reflectivity $R_3$ of the third information layer 22, and the reflectivity $R_4$ of the fourth information layer 34 are all preferably 0.01 (1(%)) or greater. Accordingly, it is preferable that $$0.0002 \leq (R_2 \times R_3 \times R_4 \times 2)/R_1.$$

Furthermore, the reflectivity $R_1$ of the first information layer 14 is preferably greater than at least two of the reflectivity $R_2$ of the second information layer 18, the reflectivity $R_3$ of the third information layer 22, and the reflectivity $R_4$ of the fourth information layer 34. The reflectivity $R_1$ of the first information layer 14 is more preferably greater than any of the reflectivity $R_2$ of the second information layer 18, the reflectivity $R_3$ of the third information layer 22, and the reflectivity $R_4$ of the fourth information layer 34.

The fourth information layer 34 is located within the range of 40 μm or more from the light incident surface 28 in the direction of thickness. That is, the first information layer 14, the second information layer 18, the third information layer 22, and the fourth information layer 34 are all located within the range of 40 μm or more from the light incident surface 28 in the direction of thickness. Preferably, the first information layer 14, the second information layer 18, the third information layer 22, and the fourth information layer 34 are all located within the range of 50 μm or more from the light incident surface 28 in the direction of thickness. More preferably, the first information layer 14, the second information layer 18, the third information layer 22, and the fourth information layer 34 are all located within the range of 60 μm or more from the light incident surface 28 in the direction of thickness.

Furthermore, the second spacer layer 20 is greater by 3 μm or more in thickness than the first spacer layer 16 and the third spacer layer 32. The other components are the same as those of the optical recording medium 10, and will be thus indicated with the same signs as those in FIG. 1 without further explanations.

The material and the concavo-convex pattern of both sides of the third spacer layer 32 are the same as those of the first spacer layer 16 and the second spacer layer 20.

The fourth information layer 34 is formed in a concavo-convex pattern following the concavo-convex pattern of the third spacer layer 32. The structure and material of the fourth information layer 34 are the same, e.g., as those of the first information layer 14.

A description will now be made to the operation of the optical recording medium 30.

In the optical recording medium 30, the first spacer layer 16 and the third spacer layer 32 are equal to each other in thickness. Thus, upon reproducing data on the first information layer 14, crosstalk light reflected in another manner may likely have greater effects on the signal beam.

More specifically, as shown with the solid line in FIG. 2, the main signal beam is incident upon the first information layer 14, on which data is to be reproduced, from the cover layer 24 side and then reflected only once towards the cover layer 24. Meanwhile, as shown with the chain double-dashed line in the figure, a first beam of crosstalk light is incident upon the second information layer 18 from the cover layer 24 side to be reflected towards the cover layer 24. Next, the first crosstalk light is incident upon the fourth information layer 34 from the substrate 12 side to be reflected towards the substrate 12, and is further incident upon the third information layer 22 from the cover layer 24 side to be reflected back towards the cover layer 24. The optical path of the first crosstalk light coincides with the optical path of the main signal beam. Furthermore, a second beam of crosstalk light is incident upon the third information layer 22 from the cover layer 24 side to be reflected towards the cover layer 24. Next, the second crosstalk light is incident upon the fourth information layer 34 from the substrate 12 side to be reflected towards the substrate 12, and is further incident upon the second information layer 18 from the cover layer 24 side to be reflected back towards the cover layer 24. The optical path of the second crosstalk light also coincides with the optical path of the main signal beam.

On the other hand, the optical recording medium 30 is configured to have such confocal crosstalk that has been reduced to a practically insignificant level even with the first spacer layer 16 and the third spacer layer 32 being equal to each other in thickness. This is because the reflectivity $R_1$ of the first information layer 14, the reflectivity $R_2$ of the second information layer 18, the reflectivity $R_3$ of the third information layer 22, and the reflectivity $R_4$ of the fourth information layer 34 satisfy the relationship expressed by the above Equation (II). This effect will be explained later in more detail with reference to the Experimental examples.

As mentioned above, the confocal crosstalk can be reduced even when the first spacer layer 16 and the third spacer layer 32 are equal to each other in thickness. Thus, either the first spacer layer 16 or the third spacer layer 32, which were conventionally given different thicknesses to prevent confocal crosstalk, can be made thinner in thickness than before. It is thus possible to increase the stack density of information layers in the direction of thickness as compared with a conventional one.

Thus, if the information layer closest to the light incident surface and the information layer farthest from the light incident surface are located at the same positions as before, then four information layers can be provided, for example, at a region where only three information layers could be conventionally provided.

Alternatively, for example, the fourth information layer 34 closest to the light incident surface 28 can be relocated farther away from the light incident surface 28 than the conventional position. And/or, the first information layer 14 farthest from the light incident surface 28 can be relocated closer to the light incident surface 28 as compared with the conventional position. It is thus possible to prevent errors due to tilt of the optical recording medium 30 and/or errors due to a foreign matter on the light incident surface 28.

Furthermore, the second spacer layer 20 is greater by 3 µm or more in thickness than the first spacer layer 16 and the third spacer layer 32. Therefore, even when the reflectivity $R_1$ of the first information layer 14, the reflectivity $R_2$ of the second information layer 18, and the reflectivity $R_3$ of the third information layer 22 do not meet the relationship expressed by the above Equation (I), crosstalk between the first information layer 14, the second information layer 18, and the third information layer 22 is reduced. Likewise, the confocal crosstalk is also reduced between the second information layer 18, the third information layer 22, and the fourth information layer 34.

Note that the reflectivity $R_1$ of the first information layer 14, the reflectivity $R_2$ of the second information layer 18, and the reflectivity $R_3$ of the third information layer 22 may be allowed to satisfy the relationship expressed by the above Equation (I). The thickness of the second spacer layer 20 may also be made equal to those of the first spacer layer 16 and the third spacer layer 32. This makes it possible to further increase the stack density of information layers in the direction of thickness. In this case, it is preferable that the reflectivity $R_2$ of the second information layer 18, the reflectivity $R_3$ of the third information layer 22, and the reflectivity $R_4$ of the fourth information layer 34 also satisfy the relationship equivalent to the above Equation (I), that is, $$(R_3 \times R_4 \times R_3)/R_2 \leq 0.0032.$$

A description will now be made to a third exemplary embodiment of the present invention.

Figure 3:
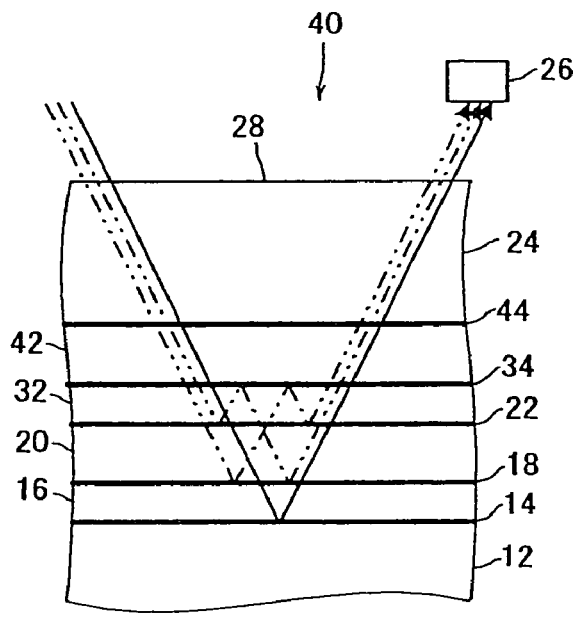

While the optical recording medium 30 according to the second exemplary embodiment has a four-layer structure, an optical recording medium 40 according to the third exemplary embodiment is characterized by having a five-layer structure which, as shown in FIG. 3, includes a fourth spacer layer 42 and a fifth information layer 44 on the cover layer 24 side of the fourth information layer 34.

The fifth information layer 44 is located within the range of 40 µm or more from the light incident surface 28 in the direction of thickness. That is, the first information layer 14, the second information layer 18, the third information layer 22, the fourth information layer 34, and the fifth information layer 44 are all located within the range of 40 µm or more from the light incident surface 28 in the direction of thickness. Preferably, the first information layer 14, the second information layer 18, the third information layer 22, the fourth information layer 34, and the fifth information layer 44 are all located within the range of 50 µm or more from the light incident surface 28 in the direction of thickness. More preferably, the first information layer 14, the second information layer 18, the third information layer 22, the fourth information layer 34, and the fifth information layer 44 are all located within the range of 60 µm or more from the light incident surface 28 in the direction of thickness. The other components are the same as those of the optical recording medium 30, and will be thus indicated with the same signs as those in FIG. 2 without further explanations.

The material and the concavo-convex pattern of both sides of the fourth spacer layer 42 are the same as those of another spacer layer such as the first spacer layer 16.

The fifth information layer 44 is formed in a concavo-convex pattern following the concavo-convex pattern of the fourth spacer layer 42. The material of the fifth information layer 44 is the same, e.g., as that of the first information layer 14.

A description will now be made to the operation of the optical recording medium 40.

The optical recording medium 40 is also configured such that the first spacer layer 16 and the third spacer layer 32 are equal to each other in thickness. Thus, upon reproducing data on the first information layer 14, the optical path length of the main signal beam reflected only once on the first information layer 14 to be reproduced from coincides with the optical path length of two other reflected beams of crosstalk light.

On the other hand, the optical recording medium 40 is also configured such that the reflectivity $R_1$ of the first information layer 14, the reflectivity $R_2$ of the second information layer 18, the reflectivity $R_3$ of the third information layer 22, and the reflectivity $R_4$ of the fourth information layer 34 satisfy the relationship expressed by the above Equation (II). Thus, like the optical recording medium 30, the confocal crosstalk between the first information layer 14, the second information layer 18, the third information layer 22, and the fourth information layer 34 is reduced to a practically insignificant level even when the first spacer layer 16 and the third spacer layer 32 are equal to each other in thickness.

As mentioned above, like the optical recording medium 30, the confocal crosstalk can be reduced even when the first spacer layer 16 and the third space layer 32 are equal to each other in thickness. Accordingly, either the first spacer layer 16 or the third spacer layer 32, which were conventionally given different thicknesses to prevent confocal crosstalk, can be made thinner in thickness than before. It is thus possible to increase the stack density of information layers in the direction of thickness as compared with a conventional one.

Thus, if the information layer closest to the light incident surface and the information layer farthest from the light incident surface are located at the same positions as before, then five information layers can be provided, for example, at a region where only four information layers could be conventionally provided.

Alternatively, for example, the fifth information layer 44 closest to the light incident surface 28 can be relocated farther away from the light incident surface 28 than the conventional position. And/or, the first information layer 14 farthest from the light incident surface 28 can be relocated closer to the light incident surface 28 as compared with the conventional position. It is thus possible to prevent errors due to tilt of the optical recording medium 40 and/or errors due to a foreign matter on the light incident surface 28.

Note that the second information layer 18, the third information layer 22, the fourth information layer 34, and the fifth information layer 44 may also be regarded as corresponding to the first information layer 14, the second information layer 18, the third information layer 22, and the fourth information layer 34, respectively, so that their reflectivities satisfy the same relationship as that defined by the above Equation (II). That is, the reflectivity $R_2$ of the second information layer 18, the reflectivity $R_3$ of the third information layer 22, the reflectivity $R_4$ of the fourth information layer 34, and the reflectivity $R_5$ of the fifth information layer 44 can be defined to satisfy the following relationship:

$$(R_3 \times R_4 \times R_5 \times 2)/R_2 \leq 0.0032.$$

This makes it possible to reduce the confocal crosstalk between the second information layer 18, the third information layer 22, the fourth information layer 34, and the fifth information layer 44 as well as to further increase the stack density of information layers in the direction of thickness.

Alternatively, the three adjacent information layers of the five information layers can be defined to satisfy the relationship equivalent to the above Equation (I), with the two spacer layers between the three layers being made equal in thickness to each other. It is thus possible to further increase the stack density of information layers in the direction of thickness.

A description will now be made to a fourth exemplary embodiment of the present invention.

Figure 4:
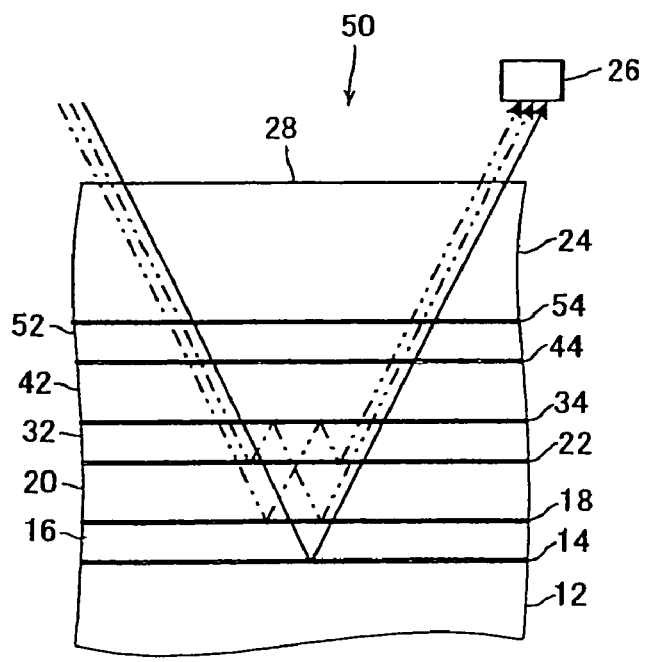

While the optical recording medium 40 according to the third exemplary embodiment has a five-layer structure, an optical recording medium 50 according to the fourth exemplary embodiment is characterized by having a six-layer structure which, as shown in FIG. 4, includes a fifth spacer layer 52 and a sixth information layer 54 on the cover layer 24 side of the fifth information layer 44.

The sixth information layer 54 is located within the range of 40 μm or more from the light incident surface 28 in the direction of thickness. That is, the first information layer 14, the second information layer 18, the third information layer 22, the fourth information layer 34, the fifth information layer 44, and the sixth information layer 54 are all located within the range of 40 μm or more from the light incident surface 28 in the direction of thickness. Preferably, the first information layer 14, the second information layer 18, the third information layer 22, the fourth information layer 34, the fifth information layer 44, and the sixth information layer 54 are all located within the range of 50 μm or more from the light incident surface 28 in the direction of thickness. More preferably, the first information layer 14, the second information layer 18, the third information layer 22, the fourth information layer 34, the fifth information layer 44, and the sixth information layer 54 are all located within the range of 60 μm or more from the light incident surface 28 in the direction of thickness. The other components are the same as those of the optical recording medium 40, and will be thus indicated with the same signs as those in FIG. 3 without further explanations.

The material and the concavo-convex pattern of both sides of the fifth spacer layer 52 are the same as those of another spacer layer such as the first spacer layer 16.

The sixth information layer 54 is formed in a concavo-convex pattern following the concavo-convex pattern of the fifth spacer layer 52. The structure and material of the sixth information layer 54 are the same, e.g., as those of the first information layer 14.

A description will now be made to the operation of the optical recording medium 50.

The optical recording medium 50 is also configured such that the first spacer layer 16 and the third spacer layer 32 are equal to each other in thickness. Thus, upon reproducing data on the first information layer 14, the optical path of the main signal beam reflected only once on the first information layer 14 to be reproduced from coincides with the optical path of two other reflected beams of crosstalk light.

On the other hand, the optical recording medium 50 is also configured such that the reflectivity $R_1$ of the first information layer 14, the reflectivity $R_2$ of the second information layer 18, the reflectivity $R_3$ of the third information layer 22, and the reflectivity $R_4$ of the fourth information layer 34 satisfy the relationship expressed by the above Equation (II). Thus, like the optical recording medium 40, the confocal crosstalk between the first information layer 14, the second information layer 18, the third information layer 22, and the fourth information layer 34 is reduced to a practically insignificant level even when the first spacer layer 16 and the third spacer layer 32 are equal to each other in thickness.

As mentioned above, like the optical recording medium 40, the confocal crosstalk can be prevented even when the first spacer layer 16 and the third spacer layer 32 are equal to each other in thickness. Thus, either the first spacer layer 16 or the third spacer layer 32, which were conventionally given different thicknesses to prevent confocal crosstalk, can be made thinner in thickness than before. It is thus possible to increase the stack density of information layers in the direction of thickness as compared with a conventional one.

Thus, if the information layer closest to the light incident surface and the information layer farthest from the light incident surface are located at the same positions as before, then six information layers can be provided, for example, at a region where only five information layers could be conventionally provided.

Alternatively, for example, the sixth information layer 54 closest to the light incident surface 28 can be relocated farther away from the light incident surface 28 than the conventional position. And/or, the first information layer 14 farthest from the light incident surface 28 can be relocated closer to the light incident surface 28 as compared with the conventional position. This makes it possible to reduce errors due to tilt of the optical recording medium 50 and/or errors due to a foreign matter on the light incident surface 28.

Note that the second information layer 18, the third information layer 22, the fourth information layer 34, and the fifth information layer 44 may also be regarded as corresponding to the first information layer 14, the second information layer 18, the third information layer 22, and the fourth information layer 34, respectively, so that their reflectivities satisfy the relationship defined by the above Equation (II). That is, the reflectivity $R_2$ of the second information layer 18, the reflectivity $R_3$ of the third information layer 22, the reflectivity $R_4$ of the fourth information layer 34, and the reflectivity $R_5$ of the fifth information layer 44 can be defined to satisfy the following relationship:

$$(R_3 \times R_4 \times R_5 \times 2)/R_2 \leq 0.0032.$$

This makes it possible to reduce the confocal crosstalk between the second information layer 18, the third information layer 22, the fourth information layer 34, and the fifth information layer 44 as well as to further increase the stack density of information layers in the direction of thickness.

Further, the third information layer 22, the fourth information layer 34, the fifth information layer 44, and the sixth information layer 54 may also be regarded as corresponding to the first information layer 14, the second information layer 18, the third information layer 22, and the fourth information layer 34, respectively, so that their reflectivities satisfy the relationship defined by the above Equation (II). That is, the reflectivity $R_3$ of the third information layer 22, the reflectivity $R_4$ of the fourth information layer 34, the reflectivity $R_5$ of the fifth information layer 44, and the reflectivity $R_6$ of the sixth information layer 54 can be defined to satisfy the following relationship:

$$(R_4 \times R_5 \times R_6 \times 2)/R_3 \leq 0.0032.$$

This makes it possible to reduce the confocal crosstalk between the third information layer 22, the fourth information layer 34, the fifth information layer 44, and the sixth information layer 54 as well as to further increase the stack density of information layers in the direction of thickness.

Note that although the optical recording medium 50 of the fourth exemplary embodiment has a six-layer structure, an optical recording medium having a multi-layer structure with seven or more layers, such as an eight-layer structure, can be increased in the stack density of the information layers in the direction of thickness by allowing a plurality of spacer layers to be equal in thickness with four adjacent information layers thereof satisfying the relationship equivalent to Equation (II).

Moreover, the three adjacent ones of the six or more information layers can be defined to satisfy the same relationship as given by the above Equation (I), with the two spacer layers between the three layers being made equal in thickness to each other. It is thus possible to further increase the stack density of information layers in the direction of thickness.

A description will now be made to a fifth exemplary embodiment of the present invention.

Figure 7:
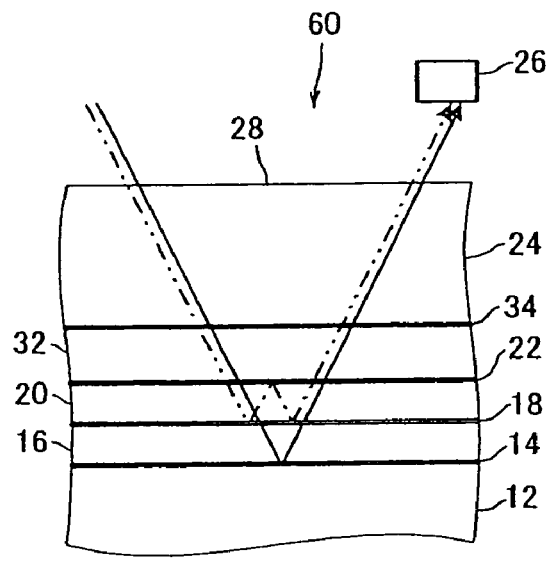
FIG. 7 a cross-sectional side view schematically illustrating the structure of an optical recording medium according to a fifth exemplary embodiment of the present invention FIG. 8 a cross-sectional side view schematically illustrating the structure of an optical recording medium according to a sixth exemplary embodiment of the present invention.

While the optical recording medium 30 according to the second exemplary embodiment has a four-layer structure with the first spacer layer 16 and the third spacer layer 32 being equal to each other in thickness, the optical recording medium 60 according to the fifth exemplary embodiment is configured as shown in FIG. 7 like the optical recording medium 10 according to the first exemplary embodiment, such that the first spacer layer 16 and the second spacer layer 20 are equal to each other in thickness, and the reflectivity $R_1$ of the first information layer 14, the reflectivity $R_2$ of the second information layer 18, and the reflectivity $R_3$ of the third information layer 22 satisfy the relationship expressed by the above Equation (I). Note that the third spacer layer 32 is different in thickness from the first spacer layer 16 and the second spacer layer 20. The other components are the same as those of the optical recording medium 30, and will be thus indicated with the same signs as those in FIG. 2 without further explanations.

A description will be made to the operation of the optical recording medium 60.

The optical recording medium 60 is configured such that the first spacer layer 16 and the second spacer layer 20 are equal to each other in thickness. Thus, upon reproducing data on the first information layer 14, the main signal beam follows the optical path, indicated with the solid line in FIG. 7, and is reflected only once on the first information layer 14 to be reproduced from. Meanwhile, a beam of crosstalk light is incident upon the second information layer 18 from the cover layer 24 side to be reflected towards the cover layer 24. Next, the crosstalk light is incident upon the third information layer 22 from the substrate 12 side to be reflected towards the substrate 12, and is further incident upon the second information layer 18 from the cover layer 24 side to be reflected back towards the cover layer 24. The optical path of the main signal beam coincides with the optical path of the crosstalk light as shown with the chain double-dashed line in FIG. 7.

On the other hand, the optical recording medium 60 is also configured such that the reflectivity $R_1$ of the first information layer 14, the reflectivity $R_2$ of the second information layer 18, and the reflectivity $R_3$ of the third information layer 22 satisfy the relationship expressed by the above Equation (I). Thus, like the optical recording medium 10, the confocal crosstalk between the first information layer 14, the second information layer 18, and the third information layer 22 is reduced to a practically insignificant level even when the first spacer layer 16 and the second spacer layer 20 are equal to each other in thickness.

As mentioned above, like the optical recording medium 10, the confocal crosstalk can be reduced even when the first spacer layer 16 and the second spacer layer 20 are equal to each other in thickness. Accordingly, either the first spacer layer 16 or the second spacer layer 20, which were conventionally given different thicknesses to prevent confocal crosstalk, can be made thinner in thickness than before. It is thus possible to increase the stack density of the information layers in the direction of thickness as compared with a conventional one.

Thus, if the information layer closest to the light incident surface and the information layer farthest from the light incident surface are located at the same positions as before, then four information layers can be provided, for example, at a region where only three information layers could be conventionally made available.

Alternatively, for example, the fourth information layer 34 closest to the light incident surface 28 can be relocated farther away from the light incident surface 28 than the conventional position. And/or, the first information layer 14 farthest from the light incident surface 28 can be relocated closer to the light incident surface 28 as compared with the conventional position. It is thus possible to prevent errors due to tilt of the optical recording medium 60 and/or errors due to a foreign matter on the light incident surface 28.

Note that the second information layer 18, the third information layer 22, and the fourth information layer 34 may also be regarded as corresponding to the first information layer 14, the second information layer 18, and the third information layer 22, respectively, so that their reflectivities satisfy the same relationship as given by the above Equation (I). That is, the reflectivity $R_2$ of the second information layer 18, the reflectivity $R_3$ of the third information layer 22, and the reflectivity $R_4$ of the fourth information layer 34 can be defined to satisfy the following relationship:

$$(R_3 \times R_4 \times R_3)/R_2 \leq 0.0032.$$

This makes it possible to reduce the confocal crosstalk between the second information layer 18, the third information layer 22, and the fourth information layer 34 as well as to further increase the stack density of information layers in the direction of thickness.

Furthermore, the three adjacent information layers of a multi-layer optical recording medium having five or more layers may also be configured to satisfy the same relationship as given by the above Equation (I), with the two spacer layers between these three information layers being equal in thickness.

A description will now be made to a sixth exemplary embodiment of the present invention.

Figure 8:
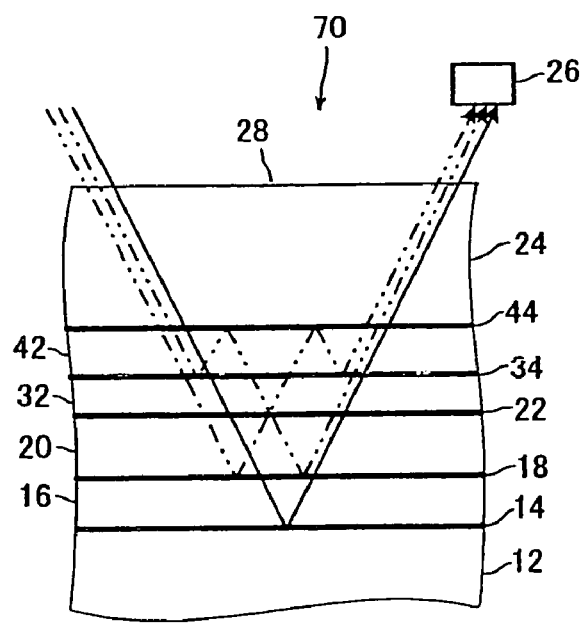

The optical recording medium 40 according to the third exemplary embodiment has a five-layer structure constructed such that the first spacer layer 16 and the third spacer layer 32, disposed to sandwich one spacer layer (the second spacer layer 20), are equal to each other in thickness. In contrast to this, as shown in FIG. 8, the optical recording medium 70 according to the sixth exemplary embodiment has a five-layer structure configured such that the first spacer layer 16 and the fourth spacer layer 42, which are disposed to sandwich two spacer layers (the second spacer layer 20 and the third spacer layer 32), are equal to each other in thickness. The optical recording medium 70 is characterized by satisfying the following Equation:

$$(R_2 \times R_4 \times R_5 \times 2)/R_1 \leq 0.0032.$$

The reflectivity $R_1$ of the first information layer 14, the reflectivity $R_2$ of the second information layer 18, the reflectivity $R_4$ of the fourth information layer 34, and the reflectivity $R_5$ of the fifth information layer 44 are all preferably 0.01 (1(%)) or greater. Accordingly, it is preferable that $$0.0002 \leq (R_2 \times R_4 \times R_5 \times 2)/R_1.$$

Note that the second spacer layer 20 and the third spacer layer 32 are different from each other in thickness. Furthermore, the second spacer layer 20 and the third spacer layer 32 are also different in thickness from the first spacer layer 16 and the fourth spacer layer 42. The other components are the same as those of the optical recording medium 40, and will be thus indicated with the same signs as those in FIG. 3 without further explanations.

Now, a description will be made to the operation of the optical recording medium 70.

In the optical recording medium 70, the first spacer layer 16 and the fourth spacer layer 42 are equal to each other in thickness. Thus, upon reproducing data on the first information layer 14, the crosstalk light reflected in another manner may likely have greater effects on the signal beam.

More specifically, as shown with the solid line in FIG. 8, the main signal beam is incident upon the first information layer 14, on which data is to be reproduced, from the cover layer 24 side and then reflected only once towards the cover layer 24. Meanwhile, as shown with the chain double-dashed line in the figure, a first beam of crosstalk light is incident upon the second information layer 18 from the cover layer 24 side to be reflected towards the cover layer 24. Next, the first crosstalk light is incident upon the fifth information layer 44 from the substrate 12 side to be reflected towards the substrate 12, and is further incident upon the fourth information layer 34 from the cover layer 24 side to be reflected back towards the cover layer 24. The optical path of the first crosstalk light coincides with the optical path of the main signal beam. Moreover, a beam of second crosstalk is incident upon the fourth information layer 34 from the cover layer 24 side to be reflected towards the cover layer 24. Next, the second crosstalk light is incident upon the fifth information layer 44 from the substrate 12 side to be reflected towards the substrate 12, and is further incident upon the second information layer 18 from the cover layer 24 side to be reflected back towards the cover layer 24. The optical path of the second crosstalk light also coincides with the optical path of the main signal beam.

On the other hand, the optical recording medium 70 is configured such that the reflectivity $R_1$ of the first information layer 14, the reflectivity $R_2$ of the second information layer 18, the reflectivity $R_4$ of the fourth information layer 34, and the reflectivity $R_5$ of the fifth information layer 44 satisfy the relationship given by the above Equation. Thus, even with the first spacer layer 16 and a fourth spacer layer 42 being equal to each other in thickness, the confocal crosstalk will be reduced to a practically insignificant level. This effect will be explained later in more detail with reference to the Experimental examples.

That is, the confocal crosstalk can be prevented even when the first spacer layer 16 and the fourth spacer layer 42 are equal to each other in thickness. Accordingly, either the first spacer layer 16 or the fourth spacer layer 42, which were conventionally given different thicknesses to prevent confocal crosstalk, can be made thinner in thickness than before. It is thus possible to increase the stack density of information layers in the direction of thickness as compared with a conventional one.

Thus, for example, if the information layer closest to the light incident surface and the information layer farthest from the light incident surface are located at the same positions as before, then five information layers can be provided at a region where only four information layers could be conventionally provided.

Alternatively, for example, the fifth information layer 44 closest to the light incident surface 28 can be relocated farther away from the light incident surface 28 than the conventional position. And/or, the first information layer 14 farthest from the light incident surface 28 can be relocated closer to the light incident surface 28 as compared with the conventional position. It is thus possible to prevent errors due to tilt of the optical recording medium 70 and/or errors due to a foreign matter on the light incident surface 28.

Note that the sixth exemplary embodiment provides the optical recording medium 70 with a five-layer structure constructed such that the first spacer layer 16 and the fourth spacer layer 42, disposed to sandwich two spacer layers, are equal to each other in thickness. In contrast, another optical recording medium may also be employed which has n+1 or greater information layers (n is an integer equal to 5 or greater), where the information layer closest to the substrate among any n adjacent information layers included therein is referred to as the first information layer, and the information layer closest to the cover layer as the nth information layer. This optical recording medium may be constructed such that the reflectivity $R_1$ of the first information layer, the reflectivity $R_2$ of the second information layer, the reflectivity $R_{n-1}$ of the (n−1)th information layer, and the reflectivity $R_n$ of the nth information layer satisfy the following Equation (III):

$(R_2 \times R_{n-1} \times R_n \times 2)/R_1 \leq 0.0032$  Equation (III).

While satisfying the above Equation (III), this optical recording medium may also be configured such that the first spacer layer and the (n−1)th spacer layer, disposed to sandwich two or more spacer layers, are equal to each other in thickness. It is preferable that the reflectivity $R_1$ of the first information layer 14, the reflectivity $R_2$ of the second information layer 18, the reflectivity $R_{n-1}$ of the (n−1)th information layer, and the reflectivity $R_n$ of the nth information layer are all 0.01 (1(%)) or greater. Accordingly, it is preferable that $0.0002 \leq (R_2 \times R_{n-1} \times R_n \times 2)/R_1$.

Note that in the first to sixth exemplary embodiments, for the R type, the first information layer 14, the second information layer 18, the third information layer 22, the fourth information layer 34, the fifth information layer 44, and the sixth information layer 54 have the recording film which is formed of a material substantially consisting of Bi, O, and M or a material substantially consisting of Bi and O, or formed in a stacked layer structure of Si layer and Cu layer as an example. However, any other materials may also be used for the recording film so long as the layers formed of the material can satisfy the above Equation (I), Equation (II), and/or Equation (III).

Furthermore, in the first to sixth exemplary embodiments, a single-sided optical recording media having information layers only on one side thereof have been illustrated by way of example. However, naturally, the present invention is also applicable to a double-sided optical recording media that have information layers on both sides thereof.

Experimental Example 1

Four types of samples A, B, C, and D were prepared with the same three-layer structure as that of the optical recording medium 10 of the first exemplary embodiment. Specifically, these samples A to D are configured as shown in Table 1.

TABLE 1

| Sample | | | A | B | C | D |
|---|---|---|---|---|---|---|
| Cover layer | | Thickness (μm) | 70.0 | 70.0 | 70.0 | 70.0 |
| Third information layer | Thickness (nm) | Dielectric film(TiO$_2$) | 8.0 | 8.0 | 8.0 | 8.0 |
| | | Recording film(BiGeO) | 49.5 | 47.0 | 51.0 | 53.0 |
| | | Dielectric film(TiO$_2$) | 8.0 | 8.0 | 8.0 | 8.0 |
| | | Reflectivity $R_3$ | 0.047 | 0.057 | 0.047 | 0.031 |
| Second spacer layer | | Thickness (μm) | 15.0 | 15.0 | 15.0 | 15.0 |
| Second information layer | Thickness (nm) | Dielectric film(TiO$_2$) | 8.0 | 8.0 | 8.0 | 8.0 |
| | | Recording film(BiGeO) | 41.5 | 42.0 | 47.0 | 51.0 |
| | | Dielectric film(TiO$_2$) | 8.0 | 8.0 | 8.0 | 8.0 |
| | | Reflectivity $R_2$ | 0.059 | 0.056 | 0.044 | 0.031 |
| First spacer layer | | Thickness (μm) | 15.0 | 15.0 | 15.0 | 15.0 |
| First information layer | Thickness (nm) | Dielectric film(TiO$_2$) | 8.0 | 8.0 | 8.0 | 8.0 |
| | | Recording film(BiGeO) | 40.0 | 25.0 | 40.0 | 47.0 |
| | | Dielectric film(TiO$_2$) | 8.0 | 8.0 | 8.0 | 8.0 |
| | | Reflectivity $R_1$ | 0.035 | 0.058 | 0.041 | 0.034 |
| | | Reflectivity fluctuation (%) | 17.2 | 13.9 | 12.1 | 7.6 |
| | | $(R_2 \times R_3 \times R_2)/R_1$ | 0.00467 | 0.00308 | 0.00222 | 0.00088 |

Note that the thickness of the cover layer 24 shown in Table 1 includes the thickness of the hard coat layer. Moreover, the substrate 12 is approximately 1.1 mm in thickness. Furthermore, the samples A to D are all of the recordable type or the write-once type, commonly with the ratio of the number of atoms Bi:Ge:O=21:14:65, where Bi, Ge, and O constitute the recording film of the first information layer 14, the second information layer 18, and the third information layer 22.

Measurements were made on these four types of samples A to D to find the reflectivity (of the blank portion) of the first information layer 14, the second information layer 18, and the third information layer 22. Furthermore, with these four types of samples A to D, the fluctuation in reflectivity of the first information layer 14 was measured. The measurement results are also shown in Table 1. Note that the reflectivities shown in Table 1 were ones detected by the photodetector 26. Moreover, the fluctuation in reflectivity was determined by dividing the difference between the maximum reflectivity value and the minimum value along one circumference by the maximum reflectivity value. Furthermore, the measurements were conducted using the optical recording medium evaluation device ODU 1000 (manufactured by Pulstec Industrial Co., Ltd.). The measurement conditions (reproduction conditions) are shown below.

Wavelength: 405 nm
Numerical aperture: 0.85
Reproduction power: 0.7 mW

Furthermore, with the samples A to D, the value of $(R_2 \times R_3 \times R_2)/R_1$ was calculated. The computation results are also shown in Table 1. Furthermore, the relationship between the value of $(R_2 \times R_3 \times R_2)/R_1$ and the fluctuation in reflectivity of the first information layer 14 is shown in FIG. 5.

Figure 5:
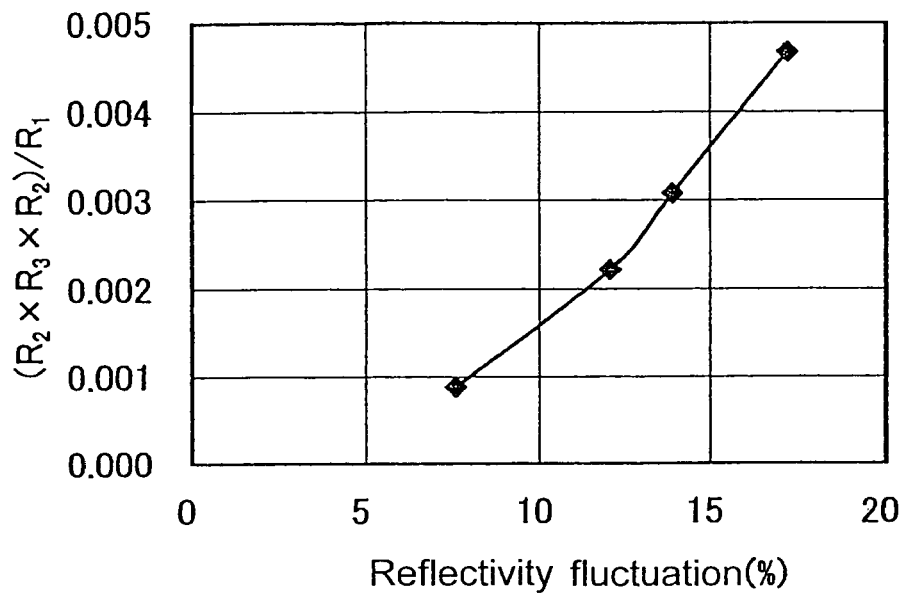

As shown in Table 1 and FIG. 5, it can be seen that the fluctuation in reflectivity of the first information layer 14 tends to grow greater with increasing values of $(R_2 \times R_3 \times R_2)/R_1$. The fluctuation in reflectivity of the first information layer 14 is thought to be mainly caused by the fact that the main signal beam reflected only once on the first information layer 14 as indicated with the solid line in FIG. 1 is affected by the crosstalk light reflected on the second information layer 18, the third information layer 22, the second information layer 18 in that order, as shown with the chain double-dashed line in the figure. Thus, the fluctuation is thought to be due to the fact that as the value of $(R_2 \times R_3 \times R_2)/R_1$ increases, the intensity of the crosstalk light that is reflected on the second information layer 18, the third information layer 22, and the second information layer 18 in that order also increases with respect to the intensity of the main signal beam.

The so-called BD optical recording medium is required to limit the fluctuation in reflectivity of each information layer within 15%. As shown in Table 1 and FIG. 5, with the value of $(R_2 \times R_3 \times R_2)/R_1$ being equal to or less than 0.0032, the fluctuation in reflectivity of the first information layer 14, which is most likely to increase, is restricted within 15%. That is, it was confirmed that for the triple layer optical recording medium, the fluctuation in reflectivity of each information layer is reduced within 15% so long as the reflectivity of the three information layers satisfies the above Equation (I) even when the two spacer layers are equal to each other in thickness.

Experimental Example 2

Four types of samples E, F, G, and H were prepared which had the same four-layer structure as that of the optical recording medium 30 of the second exemplary embodiment. Specifically, these samples E to H are configured as shown in Table 2.

the blank portion or the space of the recorded portion) of the first information layer 14, the second information layer 18, the third information layer 22, and the fourth information layer 34. Furthermore, these four types of samples E to H were measured to determine the fluctuation in reflectivity of the first information layer 14. The measurement results are also shown in Table 2.

Furthermore, the value of $(R_2 \times R_3 \times R_4 \times 2)/R_1$ was calculated for the samples E to H. The computation results are also shown in Table 2. Furthermore, the relationship between the value of $(R_2 \times R_3 \times R_4 \times 2)/R_1$ and the fluctuation in reflectivity of the first information layer 14 is shown in FIG. 6.

Figure 6:
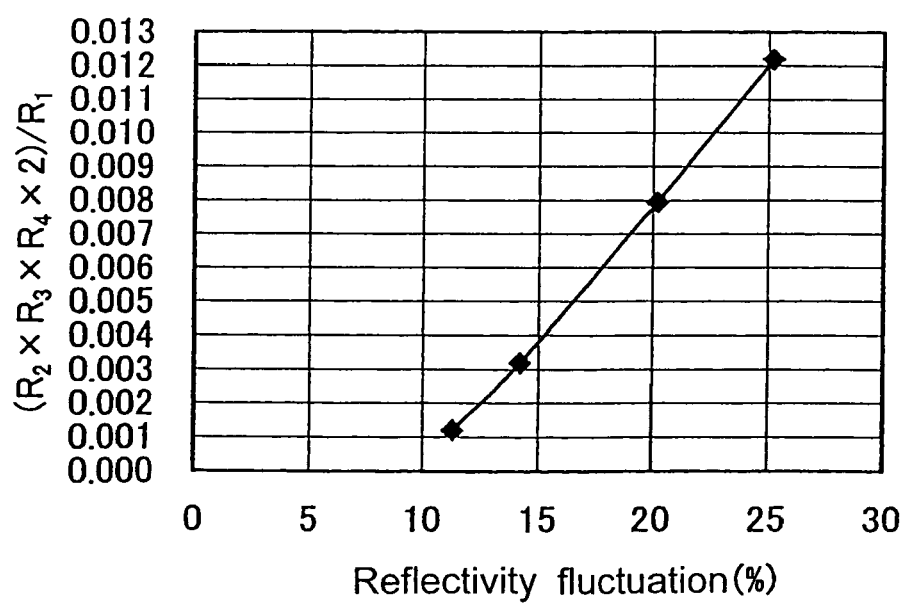

As shown in Table 2 and FIG. 6, it can be seen that with increasing values of $(R_2 \times R_3 \times R_4 \times 2)/R_1$, the fluctuation in reflectivity of the first information layer 14 is likely to increase. The reason is thought as follows. That is, the main signal beam reflected only once on the first information layer 14 as indicated with the solid line in FIG. 2 is affected by two beams of crosstalk light as indicated with the chain double-dashed line in the figure. One beam of the crosstalk light is reflected on the second information layer 18, the fourth information layer 34, and the third information layer 22 in that order, while the other crosstalk light is reflected on the third information layer 22, the fourth information layer 34, and the second information layer 18 in that order. The fluctuation in reflectivity of the first information layer 14 is mainly caused by the signal beam being affected by these crosstalk beams. As the value of $(R_2 \times R_3 \times R_4 \times 2)/R_1$ increases, the intensity of the beams of the crosstalk light is thought to become greater

TABLE 2

| Sample | | | E | F | G | H |
|---|---|---|---|---|---|---|
| Cover layer | Thickness (μm) | | 60.0 | 60.0 | 60.0 | 60.0 |
| Fourth information layer | Thickness (nm) | Dielectric film(TiO$_2$) | 8.0 | 8.0 | 0.0 | 0.0 |
| | | Recording film(BiGeO) | 56.5 | 51.0 | 0.0 | 0.0 |
| | | Dielectric film(TiO$_2$) | 8.0 | 8.0 | 12.0 | 14.5 |
| | Reflectivity R$_4$ | | 0.024 | 0.040 | 0.062 | 0.081 |
| Third spacer layer | Thickness (μm) | | 15.0 | 15.0 | 15.0 | 15.0 |
| Third information layer | Thickness (nm) | Dielectric film(TiO$_2$) | 8.0 | 8.0 | 0.0 | 0.0 |
| | | Recording film(BiGeO) | 55.0 | 48.0 | 0.0 | 0.0 |
| | | Dielectric film(TiO$_2$) | 8.0 | 8.0 | 13.5 | 17.0 |
| | Reflectivity R$_3$ | | 0.025 | 0.043 | 0.063 | 0.079 |
| Second spacer layer | Thickness (μm) | | 25.0 | 25.0 | 25.0 | 25.0 |
| Second information layer | Thickness (nm) | Dielectric film(TiO$_2$) | 8.0 | 8.0 | 0.0 | 0.0 |
| | | Recording film(BiGeO) | 52.5 | 42.0 | 0.0 | 0.0 |
| | | Dielectric film(TiO$_2$) | 8.0 | 8.0 | 15.5 | 20.5 |
| | Reflectivity R$_2$ | | 0.025 | 0.039 | 0.062 | 0.080 |
| First spacer layer | Thickness (μm) | | 15.0 | 15.0 | 15.0 | 15.0 |
| First information layer | Thickness (nm) | Dielectric film(TiO$_2$) | 8.0 | 8.0 | 0.0 | 0.0 |
| | | Recording film(BiGeO) | 52.5 | 20.0 | 0.0 | 0.0 |
| | | Dielectric film(TiO$_2$) | 8.0 | 8.0 | 19.0 | 29.5 |
| | Reflectivity R$_1$ | | 0.025 | 0.042 | 0.061 | 0.084 |
| | Reflectivity fluctuation (%) | | 11.3 | 14.2 | 20.2 | 25.2 |
| $(R_2 \times R_3 \times R_4 \times 2)/R_1$ | | | 0.00120 | 0.00319 | 0.00794 | 0.01219 |

Note that the thickness of the cover layer 24 shown in Table 2 also includes the thickness of the hard coat layer. Moreover, the substrate 12 is approximately 1.1 mm in thickness. The samples E and F are also of the recordable type or the write-once type. Like samples A to D of Experimental example 1, the samples E and F have in common the ratio of the number of atoms Bi:Ge:O=21:14:65, where Bi, Ge, and O constitute the recording film of the first information layer 14, the second information layer 18, the third information layer 22, and the fourth information layer 34. On the other hand, the samples G and H are of the ROM type, where the first information layer 14, the second information layer 18, the third information layer 22, and the fourth information layer 34 have no recording film but only dielectric film (reflective film).

With these four types of samples E to H, like Experimental example 1, measurements were made on the reflectivity (of with respect to the intensity of the main signal beam. Here, the one beam of crosstalk light is reflected on the second information layer 18, the fourth information layer 34, and the third information layer 22 in that order, and the other beam of the crosstalk light is reflected on the third information layer 22, the fourth information layer 34, and the second information layer 18 in that order.

As shown in Table 2 and FIG. 6, if the value of $(R_2 \times R_3 \times R_4 \times 2)/R_1$ is equal to or less than 0.0032, then the fluctuation in reflectivity of the first information layer 14 which would likely have the greatest reflectivity fluctuation is limited within 15%. That is, it was revealed about the quadruple layer optical recording medium that even when its two spacer layers are equal to each other in thickness, the fluctuation in reflectivity of each information layer is reduced within 15% if the reflectivity of the four information layers satisfies the above Equation (II). Note that in the case of the quadruple layer optical recording medium where the first spacer layer and the third spacer layer are equal to each other in thickness, there are two differently reflected beams of crosstalk light whose optical path coincides with the optical path of the main signal. Thus, it is thought to that the fluctuation in reflectivity of the first information layer 14 is reduced within 15%, like the triple layer optical recording medium, by limiting the value twice the value of $(R_2 \times R_3 \times R_4)$ to 0.0032 or less (equal to the right-hand side of the above Equation (I)).

Experimental Example 3

In contrast to Experimental example 2 above, one sample J of the four-layer structure type was prepared with the second spacer layer equal in thickness to the first spacer layer and the third spacer layer. The specific configuration of the sample J is shown in Table 3.

TABLE 3

| Sample | | | J |
|---|---|---|---|
| Cover layer | | Thickness (μm) | 60.0 |
| Fourth information layer | Thickness (nm) | Dielectric film(ZnS/SiO$_2$) | 18.0 |
| | | Reflectivity $R_4$ | 0.033 |
| Third spacer layer | | Thickness (μm) | 20.0 |
| Third information layer | Thickness (nm) | Dielectric film(ZnS/SiO$_2$) | 20.0 |
| | | Reflectivity $R_3$ | 0.039 |
| Second spacer layer | | Thickness (μm) | 20.0 |
| Second information layer | Thickness (nm) | Dielectric film(ZnS/SiO$_2$) | 23.0 |
| | | Reflectivity $R_2$ | 0.040 |
| First spacer layer | | Thickness (μm) | 20.0 |
| First information layer | Thickness (nm) | Dielectric film(ZnS/SiO$_2$) | 26.0 |
| | | Reflectivity $R_1$ | 0.036 |
| | | Reflectivity fluctuation (%) | 13.0 |
| | | $(R_2 \times R_3 \times R_2)/R_1$ | 0.00173 |
| | | $(R_2 \times R_3 \times R_4 \times 2)/R_1$ | 0.00286 |
| | $(R_2 \times R_3 \times R_2)/R_1 + (R_2 \times R_3 \times R_4 \times 2)/R_1$ | | 0.00459 |

Note that the sample J is of the ROM type like samples G and H, and configured such that the first information layer 14, the second information layer 18, the third information layer 22, and the fourth information layer 34 have no recording film but only dielectric film (reflective film). The molecular number ratio of the dielectric film, ZnS/SiO$_2$, is ZnS:SiO$_2$=80:20. The other aspects of the configuration of the sample J are the same as those of the samples G and H and thus will not be repeatedly described.

Like the samples G and H, measurements were made on the sample J to find the reflectivity of (the space of the recorded portion) of the first information layer 14, the second information layer 18, the third information layer 22, and the fourth information layer 34. The sample J was also measured to find the fluctuation in reflectivity of the first information layer 14. The measurement results are also shown in Table 3.

Furthermore, with the sample J, the value of $(R_2 \times R_3 \times R_2)/R_1$, the value of $(R_2 \times R_3 \times R_4 \times 2)/R_1$, and their sum were calculated. The computation results are also shown in Table 3.

As shown in Table 3, with the four-layer structure sample J in which three spacer layers are equal to each other in thickness, the fluctuation in reflectivity of the first information layer 14, which would likely have the greatest reflectivity fluctuation, was also reduced within 15% when the values of $(R_2 \times R_3 \times R_2)/R_1$ and $(R_2 \times R_3 \times R_4 \times 2)/R_1$ are each equal to or less than 0.0032. That is, it was revealed about the quadruple layer optical recording medium that even when the three spacer layers are equal to each other in thickness, the fluctuation in reflectivity of each information layer is reduced within 15% if the reflectivities of the four information layers satisfy the above Equations (I) and (II). In the case of the sample J of the four-layer structure with the three spacer layers equal to each other in thickness, the optical paths of three beams of reflected crosstalk light coincide with the optical path of the main signal beam. The three types of crosstalk light include one type of crosstalk light as in the case of the three-layer structure of the first exemplary embodiment and the two types of crosstalk light of the second exemplary embodiment. It is thus theoretically expected that, to reduce within 15% the fluctuation in reflectivity of the first information layer 14 which would likely have the greatest reflectivity fluctuation, the sum of the value of $(R_2 \times R_3 \times R_2)/R_1$ and the value of $(R_2 \times R_3 \times R_4 \times 2)/R_1$ needs to be reduced to 0.0032 or less. However, in practice, if the value of $(R_2 \times R_3 \times R_2)/R_1$ and the value of $(R_2 \times R_3 \times R_4 \times 2)/R_1$ are each 0.0032 or less as described above, the fluctuation in reflectivity of the first information layer 14 was reduced within 15% even when their sum was greater than 0.0032. The reason for this is not necessarily clear, but is generally thought to be as follows.

Each spacer layer may have an error in its actual thickness with respect to its design thickness, and vary in the degree of error depending on the location thereof. Accordingly, any two spacer layers intended to have the same design thickness may actually have the same or different thicknesses at the same time depending on the portion thereof. Those portions having the same thickness may be thought to mainly cause an increase in reflectivity fluctuation. The probability that in a portion of three spacer layers intended to have the same design thickness, the three layers actually have the same thickness is extremely lower than the probability that in a portion of two spacer layers intended to have the same design thickness, the layers have the same actual thickness. Therefore, such a situation is in fact thought to rarely exist where three types of reflected crosstalk light simultaneously have an optical path that coincides with the optical path of the main signal beam. Accordingly, if the value of $(R_2 \times R_3 \times R_2)/R_1$ and the value of $(R_2 \times R_3 \times R_4 \times 2)/R_1$ are each 0.0032 or less, then the fluctuation in reflectivity of the first information layer 14, which would likely have the greatest reflectivity fluctuation, is thought to be reduced within 15% even when their sum was 0.0032 or greater.

Experimental Example 4

One sample K of the four-layer structure type was prepared which had the same configuration as that of the optical recording medium 60 of the fifth exemplary embodiment. The specific configuration of sample K is as shown in Table 4.

TABLE 4

| Sample | | | K |
|---|---|---|---|
| Cover layer | | Thickness (μm) | 60.0 |
| Fourth information layer | Thickness (nm) | Dielectric film(ZnS/SiO$_2$) | 18.0 |
| | | Reflectivity R$_4$ | 0.033 |
| Third spacer layer | | Thickness (μm) | 20.0 |
| Third information layer | Thickness (nm) | Dielectric film(ZnS/SiO$_2$) | 20.0 |
| | | Reflectivity R$_3$ | 0.036 |
| Second spacer layer | | Thickness (μm) | 15.0 |
| Second information layer | Thickness (nm) | Dielectric film(ZnS/SiO$_2$) | 23.0 |
| | | Reflectivity R$_2$ | 0.042 |
| First spacer layer | | Thickness (μm) | 15.0 |
| First information layer | Thickness (nm) | Dielectric film(ZnS/SiO$_2$) | 26.0 |
| | | Reflectivity R$_1$ | 0.039 |
| | | Reflectivity fluctuation (%) | 9.3 |
| | | (R$_2$ × R$_3$ × R$_2$)/R$_1$ | 0.00163 |

Note that the sample K is also of the ROM type like the sample J, and is configured such that the first information layer 14, the second information layer 18, the third information layer 22, and the fourth information layer 34 have no recording film but only dielectric film (reflective film). Like the sample J, the molecular number ratio of ZnS/SiO$_2$ is ZnS:SiO$_2$=80:20. The other aspects of the configuration of the sample K are also the same as those of the sample J and thus will not be repeatedly described.

Like Experimental example 2, the sample K was measured to determine the reflectivity (of the space of the recorded portion) of the first information layer 14, the second information layer 18, the third information layer 22, and the fourth information layer 34. The sample K was also measured for the fluctuation in reflectivity of the first information layer 14. The measurement results are also shown in Table 4.

For the sample K, the value of (R$_2$×R$_3$×R$_2$)/R$_1$ was further calculated. The computation results are also shown in Table 4.

As shown in Table 4, the four-layer structure sample K with the adjacent first spacer layer 16 and second spacer layer 20 being equal to each other in thickness was found to behave like the three-layer structure samples A to D with the adjacent first spacer layer 16 and second spacer layer 20 being equal to each other in thickness. That is, with the value of (R$_2$×R$_3$×R$_2$)/R$_1$ being 0.0032 or less, the fluctuation in reflectivity of the first information layer 14, which would likely have the greatest reflectivity fluctuation, was found to have been reduced within 15%. That is, it was shown that for an optical recording medium of more than three layers having two adjacent spacer layers equal to each other in thickness, the fluctuation in reflectivity of each information layer is reduced within 15% if the reflectivities of the three information layers adjacent to these two spacer layers satisfy the above Equation (I).

This, like the three-layer structure, is thought to be due to the following reason. That is, the reflected crosstalk light whose optical path coincides with the optical path of the main signal beam is only one type of crosstalk light that is reflected on the second information layer 18, the third information layer 22, and the second information layer 18 in that order. Thus, with the value of (R$_2$×R$_3$×R$_2$)/R$_1$ being restricted to 0.0032 or less, the fluctuation in reflectivity of the first information layer 14 is thought to be reduced within 15% like the triple layer optical recording medium.

Experimental Example 5

A preparation was made for one sample L of the five-layer structure type which was configured in the same manner as the optical recording medium 70 of the sixth exemplary embodiment. The specific configuration of the sample L is shown in Table 5.

TABLE 5

| Sample | | | L |
|---|---|---|---|
| Cover layer | | Thickness (μm) | 50.0 |
| Fifth information layer | Thickness (nm) | Dielectric film(ZnS/SiO$_2$) | 13.0 |
| | | Reflectivity R$_5$ | 0.027 |
| Fourth spacer layer | | Thickness (μm) | 17.0 |
| Fourth information layer | Thickness (nm) | Dielectric film(ZnS/SiO$_2$) | 14.0 |
| | | Reflectivity R$_4$ | 0.031 |
| Third spacer layer | | Thickness (μm) | 13.0 |
| Third information layer | Thickness (nm) | Dielectric film(TiO$_2$) | 14.0 |
| | | Recording film(BiGeO) | 36.0 |
| | | Dielectric film(TiO$_2$) | 14.0 |
| | | Reflectivity R$_3$ | 0.066 |
| Second spacer layer | | Thickness (μm) | 20.0 |
| Second information layer | Thickness (nm) | Dielectric film(TiO$_2$) | 10.0 |
| | | Recording film(BiGeO) | 33.0 |
| | | Dielectric film(TiO$_2$) | 10.0 |
| | | Reflectivity R$_2$ | 0.059 |
| First spacer layer | | Thickness (μm) | 17.0 |
| First information layer | Thickness (nm) | Dielectric film(AlN) | 10.0 |
| | | Dielectric film(ZnS/SiO$_2$) | 20.0 |
| | | Recording film(Si) | 4.5 |
| | | Recording film(Cu) | 5.5 |
| | | Dielectric film(ZnS/SiO$_2$) | 28.0 |
| | | Reflective film(AgNdCu) | 80.0 |

TABLE 5-continued

| Sample | L |
|---|---|
| Reflectivity $R_1$ | 0.036 |
| Reflectivity fluctuation (%) | 13.3 |
| $(R_4 \times R_5 \times R_2 \times 2)/R_1$ | 0.00270 |

Note that the sample L is of the hybrid type of the R and ROM types. More specifically, the first information layer 14, the second information layer 18, and the third information layer 22 are of the R type and include recording film. The recording film of the first information layer 14 has a stacked layer structure of Cu film and Si film. The atomic number ratio of AgNdCu in the first information layer 14 is Ag:Nd:Cu=98:1:1. The molecular number ratio of $ZnS/SiO_2$ in the first information layer 14 is $ZnS:SiO_2$=80:20. Furthermore, like the samples A to F, the atomic number ratio of the recording film of the second information layer 18 and the third information layer 22 is commonly Bi:Ge:O=21:14:65. On the other hand, the fourth information layer 34 and the fifth information layer 44 are of the ROM type and have no recording film but only dielectric film (reflective film). Like the samples J and K, the fourth information layer 34 and the fifth information layer 44 have a dielectric film or $ZnS/SiO_2$ whose molecular number ratio is $ZnS:SiO_2$=80:20.

With the sample L, measurements were made on the reflectivity (of the space of the recorded portion or the blank portion) of the first information layer 14, the second information layer 18, the third information layer 22, the fourth information layer 34, and the fifth information layer 44. With the sample L, the fluctuation in reflectivity of the first information layer 14 was also measured. The measurement results are also shown in Table 5.

With the sample L, the value of $(R_2 \times R_4 \times R_5 \times 2)/R_1$ was also calculated. The computation results are also shown in Table 5.

Table 5 shows the five-layer structure sample L where the first spacer layer 16 and the fourth spacer layer 42, disposed to sandwich two spacer layers, are equal to each other in thickness. In this case, the fluctuation in reflectivity of the first information layer 14, which would likely have the greatest reflectivity fluctuation, was reduced within 15% when the value of $(R_2 \times R_4 \times R_5 \times 2)/R_1$ is 0.0032 or less. That is, the quintuple layer optical recording medium may have two both-side spacer layers disposed to sandwich two other spacer layers and having the same thickness. Even in this case, if the reflectivities of the first information layer 14, the second information layer 18, the fourth information layer 34, and the fifth information layer 44, which are adjacent to these spacer layers, satisfy the relationship expressed by the above Equation (III), the fluctuation in reflectivity of each information layer was found to be reduced within 15%.

This is thought to be because of the following reasons. That is, in the quintuple layer optical recording medium where the first spacer layer and the fourth spacer layer are equal to each other in thickness, the main signal beam reflected only once on the first information layer 14 as indicated with the solid line in FIG. 8 is affected by two beams of crosstalk light as indicated with the chain double-dashed lines in the figure. One beam of the crosstalk light is reflected on the second information layer 18, the fifth information layer 44, and the fourth information layer 34 in that order, while the other crosstalk light is reflected on the fourth information layer 34, the fifth information layer 44, and the second information layer 18 in that order. Thus, the fluctuation in reflectivity of the first information layer 14 is mainly caused by the signal beam being affected by these crosstalk beams. As the value of $(R_2 \times R_4 \times R_5 \times 2)/R_1$ decreases, the intensity of the crosstalk beams is thought to be reduced with respect to the intensity of the main signal beam. Here, one of the beams of the crosstalk light is reflected on the second information layer 18, the fifth information layer 44, and the fourth information layer 34 in that order, while the other crosstalk light is reflected on the fourth information layer 34, the fifth information layer 44, and the second information layer 18 in that order. Furthermore, there are two reflected beams of crosstalk light whose optical path coincides with the optical path of the main signal beam. Thus, the fluctuation in reflectivity of the first information layer 14 is thus thought to be reduced within 15% with the value twice the value of $(R_2 \times R_4 \times R_5)$ being limited to 0.0032 (equal to the right-hand side of the above Equation (I)) or less.

Example Computation 1

Computational models $S_1$ to $S_4$ were assumed for four types of optical recording media of the three-layer structure that is the same as the structure of the optical recording medium 10 according to the first exemplary embodiment, in order to calculate the value of $(R_2 \times R_3 \times R_2)/R_1$.

The computational model $S_1$ is configured such that $R_1$, $R_2$, and $R_3$ are commonly 0.04 (4%). In contrast to this, $S_2$ to $S_4$ are configured such that the values of $R_1$, $R_2$, or $R_3$ is increased or decreased for the value of $(R_2 \times R_3 \times R_2)/R_1$ to become smaller with respect to $S_1$. More specifically, the computational model $S_2$ has $R_1$ of 0.05 (5%) being greater by 0.01 with respect to $S_1$. Moreover, the computational model $S_3$ has $R_2$ of 0.03 being less by 0.01 with respect to $S_1$. Furthermore, the computational model $S_4$ has $R_3$ of 0.03 (3%) being less by 0.01 with respect to $S_1$. Table 6 shows the reflectivity of each information layer of the assumed computational models $S_1$ to $S_4$ and the computation results of the value of $(R_2 \times R_3 \times R_2)/R_1$.

TABLE 6

| Computational model | | $S_1$ | $S_2$ | $S_3$ | $S_4$ |
|---|---|---|---|---|---|
| Third information layer | Reflectivity $R_3$ | 0.040 | 0.040 | 0.040 | 0.030 |
| Second information layer | Reflectivity $R_2$ | 0.040 | 0.040 | 0.030 | 0.040 |
| First information layer | Reflectivity $R_1$ | 0.040 | 0.050 | 0.040 | 0.040 |
| $(R_2 \times R_3 \times R_2)/R_1$ | | 0.00160 | 0.00128 | 0.00090 | 0.00120 |

As shown in Table 6, the value of $(R_2 \times R_3 \times R_2)/R_1$ of $S_3$ with $R_2$ made less by 0.01 than that of $S_1$ was significantly reduced with respect to those of $S_2$ with $R_1$ greater than that of $S_1$ by 0.01 and $S_4$ with $R_3$ less than that of $S_1$ by 0.01. Accordingly, in reducing $(R_2 \times R_3 \times R_2)/R_1$ to a small value for the triple layer optical recording medium, $R_1$ is preferably made greater than $R_2$, and the value of $R_1$ is more preferably made greater than the value of any of $R_2$ and $R_3$.

Example Computation 2

Computational models $S_5$ to $S_8$ were assumed for four types of optical recording media of the four-layer structure that is the same as the structure of the optical recording medium 30 of the second exemplary embodiment, in order to calculate the value of $(R_2 \times R_3 \times R_4 \times 2)/R_1$.

The computational model $S_5$ is configured such that $R_1$, $R_2$, $R_3$, and $R_4$ are all commonly 0.04 (4%). In contrast to this, $S_6$ to $S_8$ are configured such that the values of $R_1$, $R_2$, and/or $R_3$ are/is increased or decreased for the value of $(R_2 \times R_3 \times R_4 \times 2)/R_1$ to be decreased with respect to $S_5$. More specifically, the computational model $S_6$ has $R_1$ of 0.05 (5%) being greater by 0.01 with respect to $S_5$. Moreover, the computational model $S_7$ has $R_2$ of 0.03 (3%) being less by 0.01 with respect to $S_5$. Furthermore, the computational model $S_8$ has $R_2$ of 0.03 (3%) and $R_3$ of 0.03 (3%) both being less by 0.01 with respect to $S_5$. Table 7 shows the reflectivity of each information layer of the assumed computational models $S_5$ to $S_8$ and the computation results of the value of $(R_2 \times R_3 \times R_4 \times 2)/R_1$.

TABLE 7

| Computational model | | $S_5$ | $S_6$ | $S_7$ | $S_8$ |
|---|---|---|---|---|---|
| Fourth information layer | Reflectivity $R_4$ | 0.040 | 0.040 | 0.040 | 0.040 |
| Third information layer | Reflectivity $R_3$ | 0.040 | 0.040 | 0.040 | 0.030 |
| Second information layer | Reflectivity $R_2$ | 0.040 | 0.040 | 0.030 | 0.030 |
| First information layer | Reflectivity $R_1$ | 0.040 | 0.050 | 0.040 | 0.040 |
| $(R_2 \times R_3 \times R_4 \times 2)/R_1$ | | 0.00320 | 0.00256 | 0.00240 | 0.00180 |

As shown in Table 7, the value of $(R_2 \times R_3 \times R_4 \times 2)/R_1$ of $S_8$ with $R_2$ and $R_3$ made less by 0.01 than that of $S_5$ was significantly reduced with respect to those of $S_6$ with $R_1$ greater than that of $S_5$ by 0.01 and $S_7$ with $R_2$ less than that of $S_5$ by 0.01. Accordingly, in reducing $(R_2 \times R_3 \times R_4 \times 2)/R_1$ to a small value for the quadruple layer optical recording medium, $R_1$ is preferably made greater than at least two of $R_2$, $R_3$, and $R_4$, and $R_1$ is more preferably made greater than any value of $R_2$, $R_3$, and $R_4$.

INDUSTRIAL APPLICABILITY

The present invention is applicable to an optical recording medium which includes three or more information layers.

The invention claimed is:

1. An optical recording medium having a three or more multi-layer structure which includes a substrate, a first information layer, a first spacer layer, a second information layer, a second spacer layer, a third information layer, and a cover layer thinner than the substrate, with these layers being stacked in that order over the substrate, wherein the following Equation (I) is satisfied:

$(R_2 \times R_3 \times R_2)/R_1 \leq 0.0032$    Equation (I), where $R_1$ is a reflectivity of the first information layer, $R_2$ is a reflectivity of the second information layer, and $R_3$ is a reflectivity of the third information layer, $R_1$, $R_2$ and $R_3$ are values of reflectivity detected by a photodetector, the first spacer layer and the second spacer layer are equal to each other in thickness, and $R_2$ is smaller than $R_3$.

2. The optical recording medium according to claim 1, wherein all information layers are disposed within a range of 50 μm or more from a light incident surface in a thickness direction.

3. The optical recording medium according to claim 1, wherein all information layers are disposed within a range of 120 μm or less from a light incident surface in a thickness direction.

4. The optical recording medium according to claim 1, on which information to instruct that at least two of the information layers are irradiated for reproducing the at least two of the information layers with reproduction laser beams at different reproduction powers has been recorded.

5. A method for reproducing the optical recording medium according to claim 4, comprising:
an irradiating step of irradiating each of the information layers contained in the optical recording medium with the reproduction laser beams; and
a reproducing step of reproducing information recorded on each of the information layers, wherein
the at least two of the information layers are irradiated with the reproduction laser beams at different reproduction powers in the irradiating step.

6. An optical recording medium having an n or more multi-layer structure (n is an integer equal to 5 or greater) which includes a substrate, a first information layer, a first spacer layer, a second information layer, a second spacer layer, a third information layer, an (n−2)th spacer layer, an (n−1)th information layer, an (n−1)th spacer layer, an nth information layer, and a cover layer thinner than the substrate, with these layers being stacked in that order over the substrate, wherein the following Equations (I) and (III) are satisfied:

$(R_2 \times R_3 \times R_2)/R_1 \leq 0.0032$    Equation (I), $(R_2 \times R_{n-1} \times R_n \times 2)/R_1 \leq 0.0032$    Equation (III), where $R_1$ is a reflectivity of the first information layer, $R_2$ is a reflectivity of the second information layer, $R_3$ is a reflectivity of the third information layer, $R_{n-1}$ is a reflectivity of the (n−1)th information layer, and $R_n$ is a reflectivity of the nth information layer, $R_1$, $R_2$, $R_3$, $R_{n-1}$, and $R_n$ are values of reflectivity detected by a photodetector, the first spacer layer and the (n−1)th spacer layer are equal to each other in thickness, the (n−2)th spacer layer is different from the first spacer layer and the (n−1)th spacer layer in thickness, and $R_2$ is smaller than $R_3$.

7. The optical recording medium according to claim 6, wherein all information layers are disposed within a range of 50 μm or more from a light incident surface in a thickness direction.

8. The optical recording medium according to claim 6, wherein all information layers are disposed within a range of 120 μm or less from a light incident surface in a thickness direction.

9. The optical recording medium according to claim 6, on which information to instruct that at least two of the information layers are irradiated for reproducing the at least two of the information layers with reproduction laser beams at different reproduction powers has been recorded.

10. A method for reproducing the optical recording medium according to claim 9, comprising:

an irradiating step of irradiating each of the information layers contained in the optical recording medium with the reproduction laser beams; and a reproducing step of reproducing information recorded on each of the information layers, wherein the at least two of the information layers are irradiated with the reproduction laser beams at different reproduction powers in the irradiating step.

* * * * *